(12) United States Patent
Wang et al.

(10) Patent No.: US 12,081,472 B2
(45) Date of Patent: Sep. 3, 2024

(54) REFERENCE SIGNAL AND EARLY TERMINATION IN A WIRELESS COMMUNICATION SYSTEM

(71) Applicant: Telefonaktiebolaget LM Ericsson (publ), Stockholm (SE)

(72) Inventors: Yi-Pin Eric Wang, Fremont, CA (US); Kazuyoshi Uesaka, Kanagawa (JP); Santhan Thangarasa, Vällingby (SE); Ritesh Shreevastav, Upplands Väsby (SE); Yutao Sui, Solna (SE); Olof Liberg, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 670 days.

(21) Appl. No.: 17/266,388

(22) PCT Filed: Aug. 8, 2019

(86) PCT No.: PCT/EP2019/071319
§ 371 (c)(1),
(2) Date: Feb. 5, 2021

(87) PCT Pub. No.: WO2020/030738
PCT Pub. Date: Feb. 13, 2020

(65) Prior Publication Data
US 2021/0314117 A1 Oct. 7, 2021

Related U.S. Application Data

(60) Provisional application No. 62/716,947, filed on Aug. 9, 2018.

(51) Int. Cl.
*H04L 5/00* (2006.01)
*H04W 76/28* (2018.01)
*G16Y 10/75* (2020.01)

(52) U.S. Cl.
CPC ............ *H04L 5/0048* (2013.01); *H04L 5/006* (2013.01); *H04W 76/28* (2018.02); *G16Y 10/75* (2020.01)

(58) Field of Classification Search
None
See application file for complete search history.

(56) References Cited

U.S. PATENT DOCUMENTS

| 10,356,752 B1* | 7/2019 | Menon ............. H04W 52/0225 |
| 2018/0124644 A1* | 5/2018 | Rico Alvarino .. H04W 52/0209 |
| 2020/0169956 A1* | 5/2020 | Sun ..................... H04L 12/2803 |

FOREIGN PATENT DOCUMENTS

| CN | 107078842 A | 8/2017 |
| WO | 2018031141 A1 | 2/2018 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, 1-791.

(Continued)

*Primary Examiner* — Minh Trang T Nguyen
(74) *Attorney, Agent, or Firm* — Murphy, Bilak & Homiller, PLLC

(57) ABSTRACT

A wireless device (12) is configured for use in a wireless communication system (10). The wireless device (12) is configured to receive signaling (16) from a network node (14). The signaling (16) in some embodiments indicates that a reference signal (20) is configured to be transmitted before and/or during every L occurrence of a physical downlink control channel search space (18), wherein L≥2. In other embodiments, the signaling (16) indicates that a reference signal (20) is configured to be transmitted before and/or during every K discontinuous reception, DRX, cycle (22), wherein K≥2.

24 Claims, 27 Drawing Sheets

---

TRANSMITTING SIGNALING INDICATING THAT A REFERENCE SIGNAL IS CONFIGURED TO BE TRANSMITTED BEFORE AND/OR DURING EVERY L OCCURRENCE OF A PHYSICAL DOWNLINK CONTROL CHANNEL SEARCH SPACE OF THE WIRELESS DEVICE, WHEREIN L ≥ 2
240

↓

TRANSMITTING A REFERENCE SIGNAL BEFORE AND/OR DURING EVERY L OCCURRENCE OF A PHYSICAL DOWNLINK CONTROL CHANNEL SEARCH SPACE OF THE WIRELESS DEVICE, WHEREIN L ≥ 2
250

(56) References Cited

OTHER PUBLICATIONS

Ericsson, "[draft] Presence of NRS on a non-anchor carrier for paging in NB-IoT", 3GPP TSG-RAN WG1 Meeting #94, Tdoc R1-1808048, Gothenburg, Sweden, Aug. 20-24, 2018, 1-3.

Ericsson, "Presence of NRS on a non-anchor carrier for paging in NB-IoT", 3GPP TSG-RAN WG1 Meeting #97, R1-1905970, Reno, Nevada, USA, May 13-17, 2019, 1-12.

Huawei, et al., "Enhancements of NB-IoT", 3GPP TSG RAN meeting #75, RP-170288, Dubrovnik, Croatia, Mar. 6-9, 2017, 1-18.

Qualcomm Incorporated, "Further discussion on WUS configurations and procedures", 3GPP TSG RAN WG1 Meeting #92, R1-1802332, Athens, Greece, Feb. 26-Mar. 2, 2018, 1-6.

3GPP, "3GPP TS 36.211 V15.2.0", 3rd Generation Partnership Project; Technical Specification Group Radio Access Network; Evolved Universal Terrestrial Radio Access (E-UTRA); Physical channels and modulation (Release 15), Jun. 2018, 1-236.

Qualcomm Incorporated, "Further discussion of Wake-up signal functions", 3GPP TSG RAN WG1 Meeting #93; R1-1807107; Busan, Korea, May 21-25, 2018, 1-7.

Ericsson, et al., "New WID on Rel-16 enhancements for NB-IoT", 3GPP TSG RAN Meeting #80; RP-181451; La Jolla, USA, Jun. 11-14, 2018, 1-4.

* cited by examiner

TRANSMITTING SIGNALING INDICATING THAT A REFERENCE SIGNAL IS CONFIGURED TO BE TRANSMITTED BEFORE AND/OR DURING EVERY L OCCURRENCE OF A PHYSICAL DOWNLINK CONTROL CHANNEL SEARCH SPACE OF THE WIRELESS DEVICE, WHEREIN L ≥ 2
240

TRANSMITTING A REFERENCE SIGNAL BEFORE AND/OR DURING EVERY L OCCURRENCE OF A PHYSICAL DOWNLINK CONTROL CHANNEL SEARCH SPACE OF THE WIRELESS DEVICE, WHEREIN L ≥ 2
250

Figure 2B

TRANSMITTING SIGNALING INDICATING THAT A REFERENCE SIGNAL IS CONFIGURED TO BE TRANSMITTED BEFORE AND/OR DURING EVERY K DISCONTINUOUS RECEPTION, DRX, CYCLE OF THE WIRELESS DEVICE, WHEREIN K ≥ 2
260

TRANSMITTING A REFERENCE SIGNAL BEFORE AND/OR DURING EVERY K DISCONTINUOUS RECEPTION, DRX, CYCLE OF THE WIRELESS DEVICE, WHEREIN K ≥ 2
270

Figure 2C

CONFIGURING A PATTERN OF DOWNLINK SUBFRAMES THAT ARE TO EACH CONTAIN REFERENCE SYMBOLS OF A REFERENCE SIGNAL ON A NON-ANCHOR CARRIER, BASED ON A DISTANCE BETWEEN A FREQUENCY POSITION OF THE NON-ANCHOR CARRIER AND A FREQUENCY POSITION OF AN ANCHOR CARRIER
340

TRANSMITTING SIGNALING INDICATING THE CONFIGURED PATTERN AND/OR TRANSMITTING THE REFERENCE SYMBOLS OF THE REFERENCE SIGNAL IN THE CONFIGURED PATTERN OF DOWNLINK SUBFRAMES ON THE NON-ANCHOR CARRIER
350

TRANSMITTING A DIFFERENT REFERENCE SIGNAL ON THE ANCHOR CARRIER
360

TRANSMITTING SIGNALING INDICATING A FREQUENCY POSITION OF THE NON-ANCHOR CARRIER
370

Figure 3B

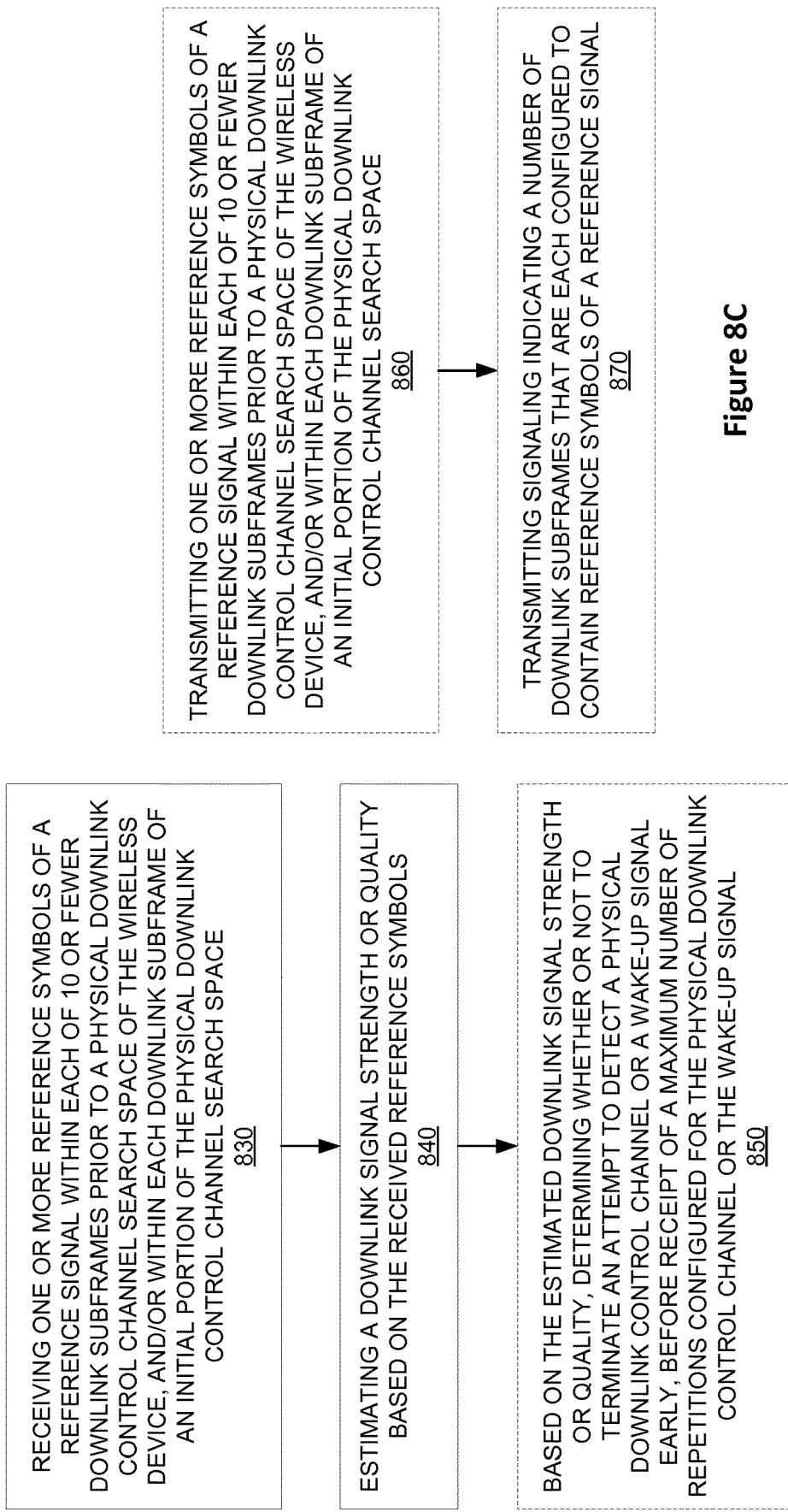

*UECapabilityInformation-NB* message

```
-- ASN1START

UECapabilityInformation-NB ::= SEQUENCE {
    rrc-TransactionIdentifier       RRC-TransactionIdentifier,
    criticalExtensions              CHOICE{
        ueCapabilityInformation-r13     UECapabilityInformation-NB-r13-IEs,
        criticalExtensionsFuture        SEQUENCE {}
    }
}

UECapabilityInformation-NB-r13-IEs ::=  SEQUENCE {
    ue-Capability-r13               UE-Capability-NB-r13,
    ue-RadioPagingInfo-r13          UE-RadioPagingInfo-NB-r13,
    lateNonCriticalExtension        OCTET STRING                            OPTIONAL,
    nonCriticalExtension            UECapabilityInformation-NB-Ext-r14-IEs
        OPTIONAL
}

UECapabilityInformation-NB-Ext-r14-IEs ::=  SEQUENCE {
    ue-Capability-ContainerExt-r14  OCTET STRING (CONTAINING UE-Capability-NB-Ext-r14-IEs),
    nonCriticalExtension            UECapabilityInformation-NB-Ext-r15-IEs
        OPTIONAL
}

UECapabilityInformation-NB-Ext-r15-IEs ::=  SEQUENCE {
    ue-Capability-ContainerExt-r15  OCTET STRING (CONTAINING UE-Capability-NB-Ext-r15-IEs),
    nonCriticalExtension            SEQUENCE {}                             OPTIONAL
}

-- ASN1STOP
```

FIGURE 12A

*UE-Capability-NB* information element

```
-- ASN1START

UE-Capability-NB-r13 ::=      SEQUENCE {
    accessStratumRelease-r13      AccessStratumRelease-NB-r13,
    ue-Category-NB-r13            ENUMERATED {nb1}                  OPTIONAL,
    multipleDRB-r13               ENUMERATED {supported}            OPTIONAL,
    pdcp-Parameters-r13           PDCP-Parameters-NB-r13            OPTIONAL,
    phyLayerParameters-r13        PhyLayerParameters-NB-r13,
    rf-Parameters-r13             RF-Parameters-NB-r13,
    dummy                         SEQUENCE {}                       OPTIONAL
}

UE-Capability-NB-Ext-r14-IEs ::=  SEQUENCE {
    ue-Category-NB-r14            ENUMERATED {nb2}                  OPTIONAL,
    mac-Parameters-r14            MAC-Parameters-NB-r14             OPTIONAL,
    phyLayerParameters-v1430      PhyLayerParameters-NB-v1430       OPTIONAL,
    rf-Parameters-v1430           RF-Parameters-NB-v1430,
    nonCriticalExtension          UE-Capability-NB-v1440-IEs        OPTIONAL
}

UE-Capability-NB-v1440-IEs ::=   SEQUENCE {
    phyLayerParameters-v1440      PhyLayerParameters-NB-v1440       OPTIONAL,
    nonCriticalExtension          SEQUENCE {}                       OPTIONAL
}

UE-Capability-NB-Ext-r15-IEs ::=  SEQUENCE {
    earlyTerminationNPDCCH        ENUMERATED {supported}            OPTIONAL,
    nonCriticalExtension          SEQUNECE {}    OPTIONAL
}
```

FIGURE 12B

REFERENCE SIGNAL AND EARLY TERMINATION IN A WIRELESS COMMUNICATION SYSTEM

TECHNICAL FIELD

The present application relates generally to a wireless communication system, and relates more particularly to a reference signal and early termination in such a system.

BACKGROUND

In a narrowband internet-of-things (NB-IOT) system, a wireless device configured for multicarrier operation may receive system broadcast information such as system information and synchronization signals only on a specific type of carrier referred to as an anchor carrier. The wireless device may receive user data on a different carrier referred to as a non-anchor carrier, on which no system broadcast information or synchronization signals may be sent.

Non-anchor paging in NB-IOT exploits a non-anchor carrier also for paging a wireless device. With non-anchor paging, a wireless device has to monitor the non-anchor carrier for a paging message during its paging occasions, i.e., by searching its physical downlink control channel search space for a physical downlink control channel intended for the wireless device. This monitoring threatens to meaningfully impact the wireless device's power consumption, though. Although repetitions of the physical downlink control channel in NB-IOT provide coverage enhancement, those repetitions make it to where a wireless device has to try to detect the maximum possible number of repetitions before accepting that no paging message has been transmitted to the device.

So-called early termination enables the wireless device to terminate an attempt to detect the physical downlink control channel early (i.e., before receipt of a maximum number of repetitions configured for the physical downlink control channel), even when no paging message is transmitted to the device. The wireless device in this case may estimate its downlink signal quality (e.g., signal-to-noise-plus-interference ratio, SINR). If the downlink signal quality is good, after trying to detect a certain number of repetitions less than the maximum number, the device can safely conclude that no paging message was transmitted to the device. Much the same can be said about early termination with respect to a so-called wake-up signal.

Transmitting a reference signal (e.g., a so-called narrowband reference signal, NRS) would facilitate downlink signal quality estimation, and thereby early termination. Estimating downlink signal quality on the non-anchor carrier by measuring a reference signal on the anchor carrier proves susceptible to error. But transmitting a reference signal on the non-anchor carrier to enable more accurate estimation of the non-anchor carrier's signal quality threatens to increase signalling overhead, operator energy costs, and system interference, especially if the reference signal was "always on". In NB-IOT and other systems, therefore, enabling accurate downlink signal measurement and/or early termination proves challenging without meaningfully increasing signalling overhead, operator energy costs, and system interference.

SUMMARY

Some embodiments herein facilitate reference signal transmission (e.g., NRS transmission on an NB-IOT non-anchor carrier) that is tailored to the capabilities and/or needs of wireless devices in estimating downlink signal strength/quality and/or in performing early termination. For example, some embodiments transmit a reference signal only if a minimum number or percentage of wireless devices are capable of early termination, e.g., so that a reference signal (primarily) dedicated to facilitating early termination is not transmitted unnecessarily. Alternatively or additionally, some embodiments transmit reference symbols of the reference signal only so often as (e.g., only in as many downlink subframes as) wireless devices actually need them in order to estimate downlink signal strength/quality within a certain range (or with a certain accuracy) and/or perform early termination. In some embodiments, tailoring reference signal transmission in this way to wireless device capabilities and/or needs may enable accurate downlink signal measurement and/or early termination, without meaningfully increasing signalling overhead, operator energy costs, and system interference.

Other embodiments herein support a wireless device's decision as to whether or not to attempt early termination (e.g., with respect to the physical downlink control channel or a wake-up signal). In some embodiments, for instance, the wireless device refrains from attempting early termination if the reference signal configuration does not support early termination by the device, e.g., due to the configuration not providing enough downlink subframes with reference symbols for an accurate downlink signal quality estimate. Alternatively or additionally, the wireless device may even refrain from acquiring the downlink signal quality estimate for use in early termination, if the reference signal configuration does not support estimating the downlink signal quality estimate within a certain range or with a certain accuracy need for early termination. Selectively refraining from one or both of these activities may intelligently conserve processing and power resources of the wireless device.

Yet other embodiments herein configure relatively sparser reference symbols of a reference signal on a non-anchor carrier (e.g., in NB-IOT) in time, e.g., so that the reference symbols occur only so often as needed for the wireless device to verify an otherwise obtained downlink signal strength/quality estimate. For example, in some embodiments, the reference signal is configured to be transmitted before and/or during every L occurrence of a device's physical downlink control channel search space ($L \geq 2$), or before and/or during every K discontinuous reception (DRX) cycles of the device ($K \geq 2$). In these embodiments, then, a wireless device may obtain the downlink signal strength/quality estimate from measurement of a different reference signal on an anchor carrier, and exploit the relatively sparser reference symbols on the non-anchor carrier simply to verify that the downlink signal strength/quality estimate from the anchor carrier accurately reflects (or has accurately been converted into) a downlink signal strength/quality estimate for the non-anchor carrier.

More particularly, embodiments herein include a method performed by a wireless device configured for use in a wireless communication system. The method comprises receiving signaling from a network node. The signaling in some embodiments indicates that a reference signal is configured to be transmitted before and/or during every L occurrence of a physical downlink control channel search space, wherein $L \geq 2$. In other embodiments, the signaling indicates that a reference signal is configured to be transmitted before and/or during every K discontinuous reception, DRX, cycle, wherein $K \geq 2$.

In some embodiments, the method further comprises receiving the reference signal, in accordance with the received signaling, before and/or during every L occurrence of a physical downlink control channel search space. Alternatively, the method may further comprise receiving the reference signal, in accordance with the received signaling, before and/or during every K DRX cycle.

In some embodiments, the method also comprises using reference symbols of the reference signal to estimate or verify a downlink signal strength or quality. In one embodiment, for instance, the method may further comprise, based on the estimated or verified downlink signal strength or quality, determining whether to terminate an attempt to detect a physical downlink control channel or a wake-up signal early, before receipt of a maximum number of repetitions configured for the physical downlink control channel or the wake-up signal. Alternatively or additionally, the method may further comprise receiving a different reference signal on an anchor carrier, and estimating the downlink signal strength or quality based on measurement of the different reference signal received on the anchor carrier and on a power difference between a non-anchor carrier and the anchor carrier. In this case, then, using reference symbols of the reference signal to estimate or verify a downlink signal strength or quality may comprise using reference symbols of the reference signal as received on the non-anchor carrier to verify the downlink signal strength or quality.

In any of these embodiments, the method may further comprise receiving, from the network node, signaling indicating a configuration of the reference signal, where such configuration of the reference signal includes configuration of a number of downlink subframes that are to each contain reference symbols of the reference signal. In this case, the method may also comprise determining whether the configuration of the reference signal supports early termination by the wireless device. Here, early termination comprises termination of an attempt to detect a physical downlink control channel or a wake-up signal before receipt of a maximum number of repetitions configured for the physical downlink control channel or the wake-up signal. The method may then correspondingly include attempting or not attempting early termination depending respectively on whether or not the configuration of the reference signal supports early termination by the wireless device.

In one such embodiment, determining whether the configuration of the reference signal supports early termination by the wireless device comprises respectively determining whether or not the number of downlink subframes that are to each contain reference symbols of the reference signal according to the configuration is at least as great as a required number of downlink subframes that the wireless device requires in order to estimate from that reference signal downlink signal strength or quality within a certain range. In one embodiment, this certain range includes downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal.

In some embodiments, the method alternatively or additionally further comprise receiving from the network node signaling indicating a number of downlink subframes that are each configured to contain reference symbols of the reference signal. The method may then comprise determining whether to measure the reference symbols of the reference signal in the downlink subframes in order to estimate a downlink signal strength or quality, depending respectively on whether or not the indicated number of downlink subframes is at least as great as a required number of downlink subframes that the wireless device requires to each contain reference symbols of the reference signal in order to estimate downlink signal strength or quality from that reference signal. In one embodiment, for example, the required number of downlink subframes is a number of downlink subframes that the wireless device requires to each contain reference symbols of the reference signal in order to estimate from the reference signal downlink signal strength or quality within a certain range, where this certain range includes downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal.

In some embodiments, the method further comprises transmitting to the network node signaling indicating that the wireless device is capable of early termination. Here, early termination comprises termination of an attempt to detect a physical downlink control channel or a wake-up signal before receipt of a maximum number of repetitions configured for the physical downlink control channel or the wake-up signal.

In any of these embodiments, the reference signal may be a narrowband reference signal on a non-anchor carrier.

In any of these embodiments, the wireless communication system may be a narrowband internet-of-things (NB-IOT) system.

Embodiments herein also include a method performed by a network node in a wireless communication system. The method comprises transmitting signaling to a wireless device. The signaling in some embodiments indicates that a reference signal is configured to be transmitted before and/or during every L occurrence of a physical downlink control channel search space, wherein $L \geq 2$. In other embodiments, the signaling indicates that a reference signal is configured to be transmitted before and/or during every K discontinuous reception, DRX, cycle, wherein $K \geq 2$.

In some embodiments, the method further comprises transmitting the reference signal, in accordance with the signaling, before and/or during every L occurrence of a physical downlink control channel search space. Alternatively, the method may further comprise transmitting the reference signal, in accordance with the signaling, before and/or during every K DRX cycle.

In some embodiments, the method further comprises receiving signaling indicating whether a wireless device is capable of early termination. Here, early termination comprises termination of an attempt to detect a physical downlink control channel or a wake-up signal before receipt of a maximum number of repetitions configured for the physical downlink control channel or the wake-up signal. In one such embodiment, the method further comprises, based on the received signaling, configuring whether and/or when reference symbols of the reference signal is to be transmitted.

In any of these embodiments, the method may further comprise receiving, for each of one or more wireless devices served by the network node, signaling indicating whether the wireless device is capable of early termination. The method in such case may also comprise determining, based on the received signaling, whether a minimum number of wireless devices served by the network node are capable of early termination. The method may further comprise configuring the reference signal to be transmitted or to not be transmitted, depending respectively on whether the minimum number of wireless devices served by the network node are capable of early termination.

Embodiments herein also include corresponding apparatus, computer programs, and carriers. For example, embodiments herein include a wireless device configured for use in a wireless communication system. The wireless device is configured (e.g., via communication circuitry and processing circuitry) to receive signaling from a network node. The signaling in some embodiments indicates that a reference signal is configured to be transmitted before and/or during every L occurrence of a physical downlink control channel search space, wherein L≥2. In other embodiments, the signaling indicates that a reference signal is configured to be transmitted before and/or during every K discontinuous reception, DRX, cycle, wherein K≥2.

Embodiments further include a network node configured for use in a wireless communication system. The network node is configured (e.g., via communication circuitry and processing circuitry) to transmit signaling to a wireless device. The signaling in some embodiments indicates that a reference signal is configured to be transmitted before and/or during every L occurrence of a physical downlink control channel search space, wherein L≥2. In other embodiments, the signaling indicates that a reference signal is configured to be transmitted before and/or during every K discontinuous reception, DRX, cycle, wherein K≥2.

BRIEF DESCRIPTION OF THE DRAWINGS

FIG. 2B is a logic flow diagram of a method performed by a network node according to some embodiments.

FIG. 2C is a logic flow diagram of a method performed by a network node according to other embodiments.

FIG. 3B is a logic flow diagram of a method performed by a network node according to other embodiments.

FIG. 8B is a logic flow diagram of a method performed by a wireless device according to other embodiments.

FIG. 8C is a logic flow diagram of a method performed by a network node according to other embodiments.

FIG. 12A illustrates a UE Capability Information message according to some embodiments.

FIG. 12B illustrates a UE Capability Information message according to other embodiments.

DETAILED DESCRIPTION

Figure 1A:
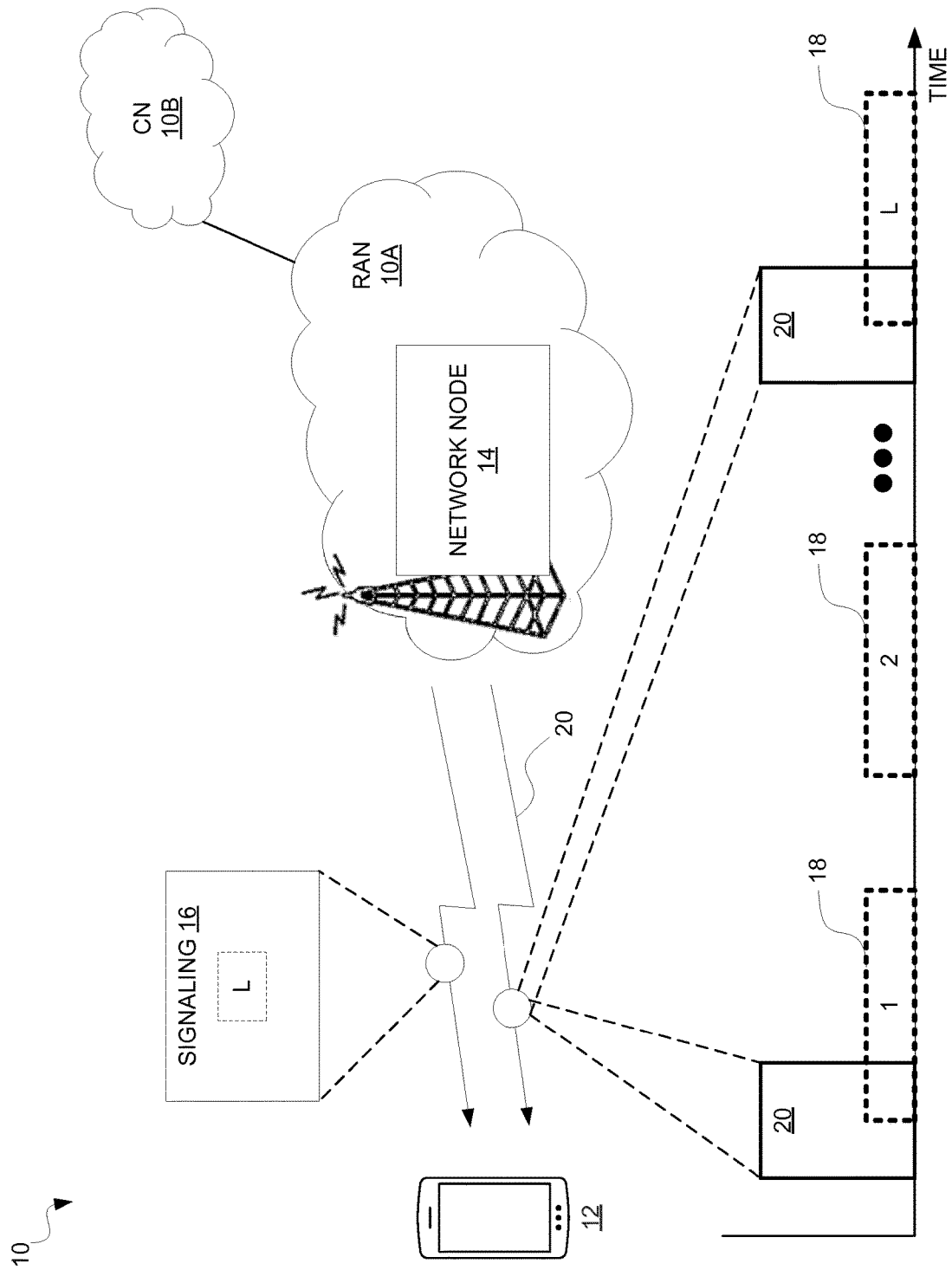
FIG. 1A is a block diagram of a wireless communication system according to some embodiments.

FIG. 1A shows a wireless communication system 10 (e.g., a narrowband internet of things, NB-IOT, system) according to some embodiments. The system 10 includes a radio access network (RAN) 10A and a core network (CN) 10B. The RAN 10A provides radio access to one or more wireless devices, one of which is shown as wireless device 12. The CN 10B connects the RAN 10A to one or more data networks, such as the internet.

In some embodiments, the wireless device 12 is configured to search within a so-called physical downlink control channel search space 18 for a physical downlink control channel (e.g., a narrowband physical downlink control channel, NPDCCH) intended for the wireless device 12 (or intended for a group of wireless devices to which the wireless device 12 belongs). Such a physical downlink control channel could, for example, carry downlink control information that is scrambled by a paging radio network temporary identity (P-RNTI) assigned to the wireless device 12, in which case the wireless device 12 would need to check for a paging message. In any event, the physical downlink control channel in some embodiments may be repeated a number of times, up to a configured maximum number of repetitions, e.g., to provide coverage enhancement.

Note that the physical downlink control channel search space 18 may be a common search space that is common to multiple wireless devices, e.g., all wireless devices in a cell that monitor the same paging occasion. Or, the physical downlink control channel search space 18 may be specific to the wireless device 12 (e.g., as a device-specific search space).

Note also that, in some embodiments, the wireless device 12 conditions its searching for a physical downlink control channel on its detection of a so-called wake-up signal. A wake-up signal is a physical signal that indicates the wireless device needs to awaken from a sleep state (or stay awaken) in order to monitor the physical downlink control channel. A wake-up signal may similarly be repeated, up to a maximum number of repetitions, e.g., for coverage enhancement. The decoding time for the wake-up signal may be considerably shorter than the decoding time for the physical downlink control channel. Accordingly, the wireless device may consume less power monitoring for a wake-up signal and may stay in the sleep state for longer.

Regardless, the physical downlink control channel search space 18 may be configured to periodically recur, e.g., every k_s slots. FIG. 1A for instance shows L occurrences of the physical downlink control channel search space 18 over time. Each occurrence of the physical downlink control channel search space 18 may be specified in the time domain in terms of a duration (e.g., a number of time slots or subframes for which an occurrence of the search space 18 exists). In embodiments where the physical downlink control channel search space is an NPDCCH search space, for instance, such a search space is defined by a set of NPDCCH candidates where each candidate is repeated in a set of R consecutive NB-IOT downlink subframes, excluding subframes used for transmission of system information messages, starting with subframe k.

In this context, a network node 14, e.g., in the RAN 10A, is configured in some embodiments to transmit signalling 16 to the wireless device 12, e.g., in system information. The signalling 16 in some embodiments indicates that a reference signal 20 (e.g., a narrowband reference signal, NRS) is configured to be transmitted before and/or during every L occurrence of the physical downlink control channel search space 18. In some embodiments, for instance, L≥2. Where L=2, for example, the reference signal 20 is transmitted before and/or during every other occurrence of the physical downlink control channel search space 18. Transmitting the reference signal 20 sparsely in time in this way may for instance conserve energy and mitigate interference attributable to the reference signal 20. Regardless, in order to indicate this, the signalling 16 may for instance include or otherwise indicate the value of L.

In some embodiments, the reference signal 20 is configured to be transmitted before every L occurrence of the physical downlink control channel search space 18. For example, the signaling 16 may indicate each of X or fewer downlink subframes prior to the physical downlink control channel search space 18 are configured to each contain reference symbols of the reference signal 20, where X may be 7, 5, 3, or some other fixed or configurable number. In other embodiments, the reference signal 20 is configured to alternatively or additionally be transmitted during the physical downlink control channel search space 18. More particularly, in some embodiments as shown, the reference signal 20 is configured to alternatively or additionally be transmitted during an initial portion of the physical downlink control channel search space 18, e.g., during the first N downlink subframes of the physical downlink control channel search space 18.

Figure 1B:
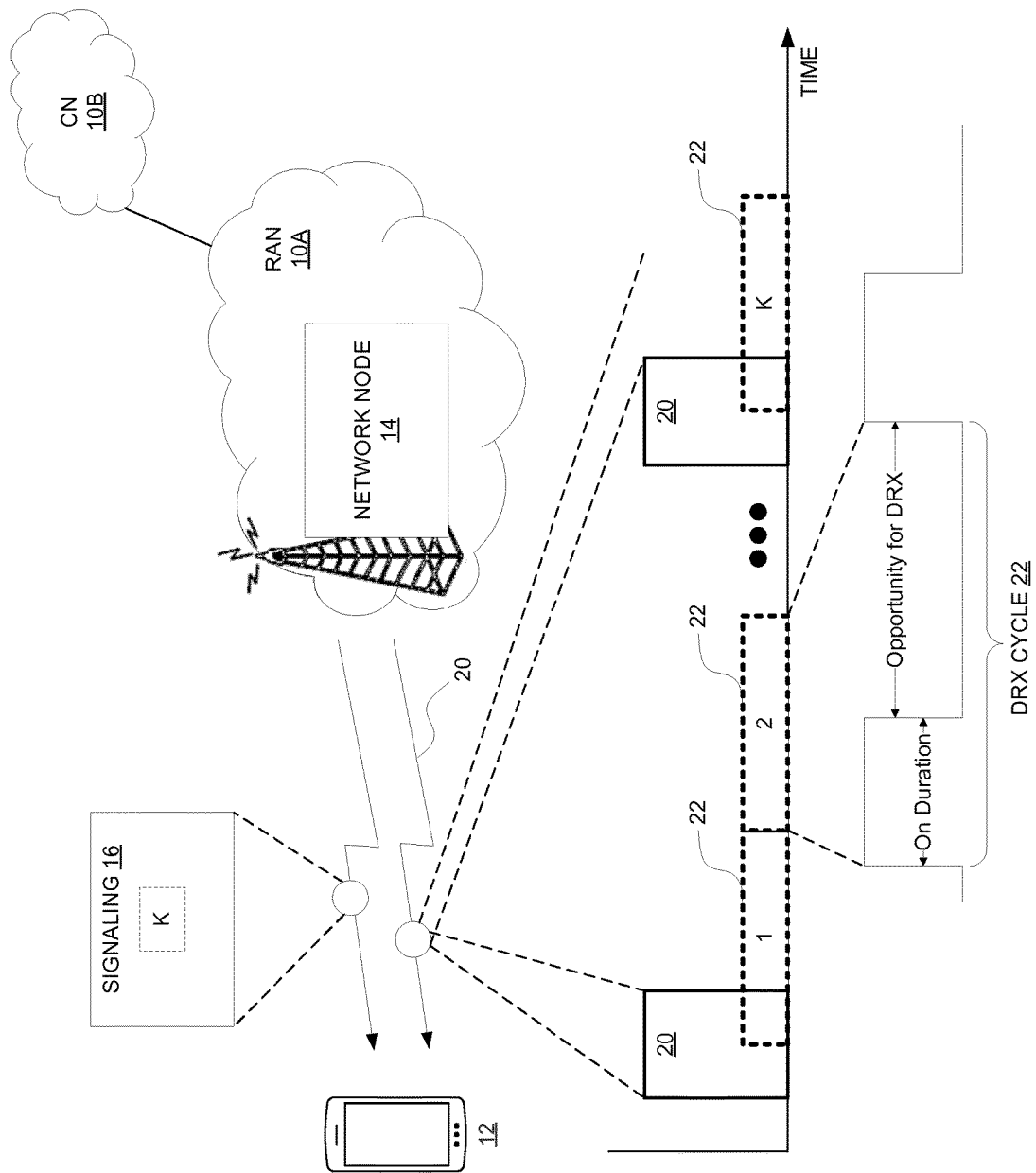
FIG. 1B is a block diagram of a wireless communication system according to other embodiments.

FIG. 1B illustrates other embodiments herein. As shown, the wireless device 12 is configured with discontinuous reception (DRX) functionality that controls the wireless device's physical downlink control channel monitoring activity. In this regard, the wireless device 12 in DRX operation is allowed to monitor the physical downlink control channel discontinuously in time, according to a DRX cycle 20 with which the wireless device 12 is configured. A DRX cycle 20 specifies the periodic repetition of a so-called onDuration followed by a possible period of inactivity, i.e., an opportunity for DRX. During the onDuration, the wireless device 12 is to monitor the physical downlink control channel. The period of inactivity following the onDuration may provide an opportunity for the wireless device 12 to cease monitoring the physical downlink control channel. This DRX cycle 20 repeatedly occurs, such that the wireless device 12 discontinuously monitors the physical downlink control channel. FIG. 1B for instance shows K DRX cycles.

In this context, the signalling 16 that the network node 14 transmits to the wireless device 12 may in other embodiments indicate that the reference signal 20 is configured to be transmitted before and/or during every K DRX cycle. In some embodiments, for instance, K≥2. Where K=2, for example, the reference signal 20 is transmitted before and/or during every other DRX cycle 22. Transmitting the reference signal 20 sparsely in time in this way may for instance conserve energy and mitigate interference attributable to the reference signal 20. Regardless, in order to indicate this, the signalling 16 may for instance include or otherwise indicate the value of K.

In some embodiments, the reference signal 20 is configured to be transmitted before every L DRX cycle 22. For example, the signaling 16 may indicate each of X or fewer downlink subframes prior to the DRX cycle 20 are configured to each contain reference symbols of the reference signal 20, where X may be 7, 5, 3, or some other fixed or configurable number. In other embodiments, the reference signal 20 is configured to alternatively or additionally be transmitted during the DRX cycle 22. More particularly, in some embodiments as shown, the reference signal 20 is configured to alternatively or additionally be transmitted during an initial portion of the DRX cycle 22, e.g., during the first N downlink subframes of the DRX cycle 22.

Considering FIGS. 1A and 1B, then, the control signalling 16 may indicate that the reference signal 20 is configured to be transmitted before and/or during: (i) every L occurrence of a physical downlink control channel search space 18, where L≥2; or (ii) every K DRX cycle 22, where K≥2. The network node 14 may correspondingly transmit and the wireless device 12 may correspondingly receive the reference signal 20 (i) every L occurrence of a physical downlink control channel search space 18; or (ii) every K DRX cycle 22.

In some embodiments, the wireless device 12 advantageously uses reference symbols of the reference signal 20 to determine whether to terminate an attempt to detect a physical downlink control channel or a wake-up signal early, before receipt of the maximum number of repetitions configured for the physical downlink control channel or the wake-up signal. For example, in some embodiments, the wireless device 12 uses reference symbols of the reference signal 20 to estimate or verify a downlink signal strength or quality. The wireless device 12 may then determine, based on that estimated or verified downlink signal strength or quality, whether to terminate an attempt to detect a physical downlink control channel or a wake-up signal early. In one embodiment, for instance, the device 12 may determine to terminate or to not terminate an attempt to detect a physical downlink control channel or a wake-up signal early, depending respectively on whether or not the estimated or verified downlink signal strength or quality is deemed 'good' (e.g., as defined by a threshold).

Note that such verification may be performed when the reference signal 20 is received on a non-anchor carrier. A non-anchor carrier is a carrier on which no system broadcast information and/or no synchronization signals are transmitted, and is contrasted with an anchor carrier on which system broadcast information and synchronization signals are transmitted. In this context, then, the wireless device 12 may receive a different reference signal (not shown) on the anchor carrier, and estimate the downlink signal strength or quality based on measurement of the different reference signal received on the anchor carrier and on a power difference between a non-anchor carrier and the anchor carrier. The wireless device 12 then use reference symbols of the reference signal 20 as received on the non-anchor carrier to verify that downlink signal strength or quality. With this verification, the wireless device 12 may confidently use the downlink signal strength or quality for determining whether to perform early termination on the non-anchor carrier, despite the downlink signal strength or quality being estimated from the anchor carrier.

Figure 2A:
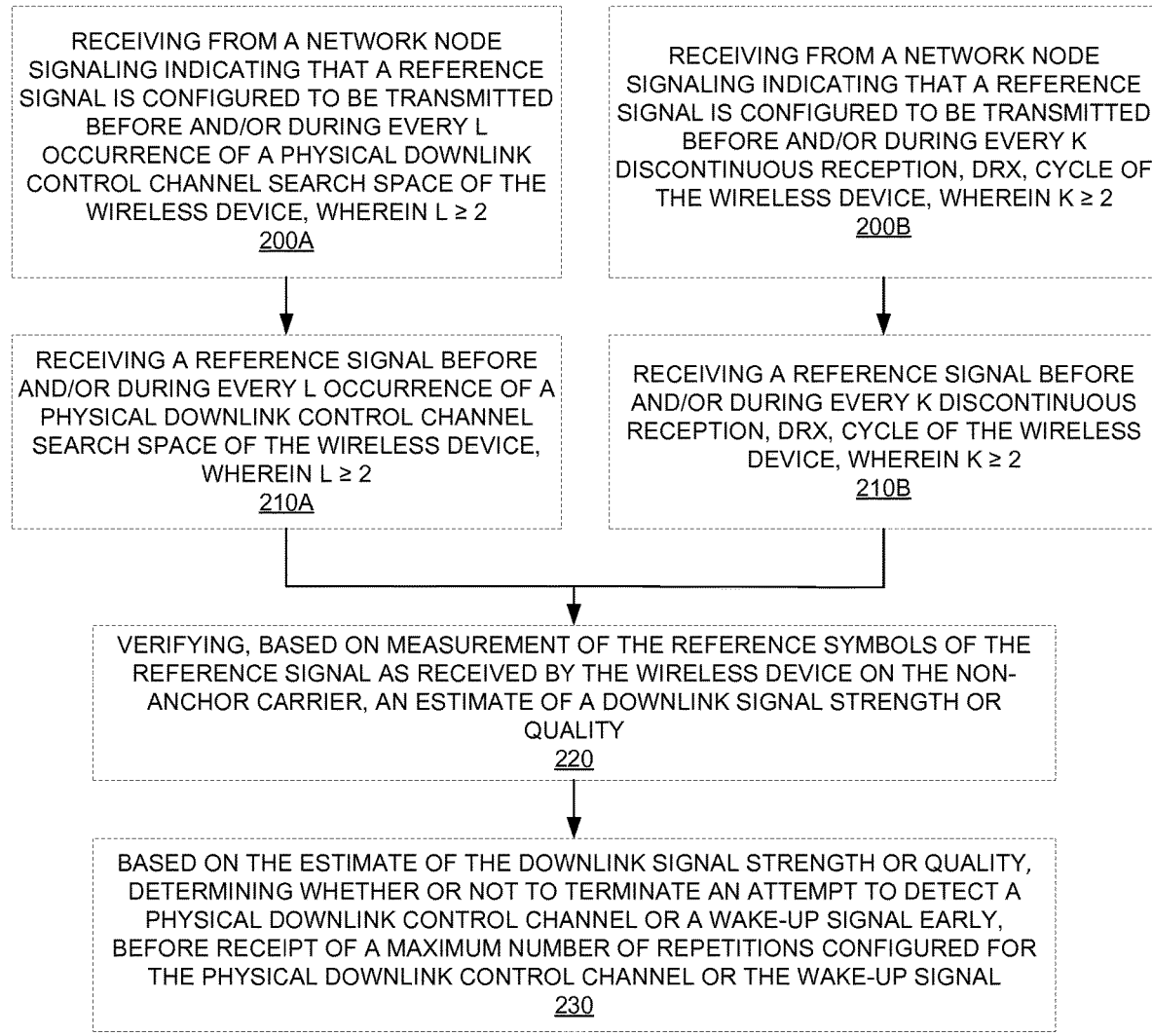
FIG. 2A is a logic flow diagram of a method performed by a wireless device according to some embodiments.

In view of the above modifications and variations, FIG. 2A depicts a method performed by a wireless device configured for use in a wireless communication system (e.g., an NB-IOT system) in accordance with yet other particular embodiments. The method as shown may include receiving from a network node signaling indicating that a reference signal (e.g., NRS) is configured to be transmitted before and/or during every L occurrence of a physical downlink control channel search space of the wireless device, wherein L≥2 (Block 200A). Alternatively or additionally, the method may include receiving a reference signal (e.g., NRS) before and/or during every L occurrence of a physical downlink control channel search space of the wireless device, wherein L≥2 (Block 200B). Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

In other embodiments, by contrast, the method may include receiving from a network node signaling indicating that a reference signal is configured to be transmitted before and/or during every K discontinuous reception, DRX, cycle of the wireless device, wherein K≥2 (Block 200B). Alternatively or additionally, the method may include receiving a reference signal before and/or during every K discontinuous reception, DRX, cycle of the wireless device, wherein K≥2 (Block 210B). Note in this regard that the DRX cycle may be common to multiple wireless devices, e.g., as a common DRX cycle. For example, a common DRX cycle may be common to all wireless devices in a cell for NB-IOT. Or, the DRX cycle may be specific to the wireless device (e.g., as a device-specific DRX cycle).

Regardless of how the timing of the reference signal is structured (e.g., on a search space granularity or a DRX cycle granularity), some embodiments allow a sparser occurrence of the reference signal than every search space or DRX cycle. This may be the case for instance where the reference signal is transmitted on a non-anchor carrier in the system. The embodiments may attain sparser reference signal occurrence in this case by for instance exploiting reference signal measurement on an anchor carrier for primary estimation of downlink signal strength or quality and relying on reference signal measurement on a non-anchor carrier simply for verification of the anchor carrier based estimate.

In these and other embodiments, then, the method may comprise verifying, based on measurement of the reference symbols of the reference signal as received by the wireless device on the non-anchor carrier, an estimate of a downlink signal strength or quality (Block 220). The method may further include, based on the estimate of the downlink signal strength or quality, determining whether or not to terminate an attempt to detect a physical downlink control channel or a wake-up signal early, before receipt of a maximum number of repetitions configured for the physical downlink control channel or the wake-up signal (Block 230).

FIG. 2B illustrates a related method performed by a network node configured for use in a wireless communication system (e.g., an NB-IOT system) in accordance with other particular embodiments. The method as shown includes transmitting signaling indicating that a reference signal (e.g., NRS) is configured to be transmitted before and/or during every L occurrence of a physical downlink control channel search space of the wireless device, wherein L≥2 (Block 240). Alternatively or additionally, the method may include transmitting a reference signal (e.g., NRS) before and/or during every L occurrence of a physical downlink control channel search space of the wireless device, wherein L≥2 (Block 250). Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

FIG. 2C illustrates still another related method performed by a network node configured for use in a wireless communication system (e.g., an NB-IOT system) in accordance with other particular embodiments. The method as shown includes transmitting signaling indicating that a reference signal is configured to be transmitted before and/or during every K discontinuous reception, DRX, cycle of the wireless device, wherein K≥2 (Block 260). Alternatively or additionally, the method may include transmitting a reference signal before and/or during every K discontinuous reception, DRX, cycle of the wireless device, wherein K≥2 (Block 270). Note in this regard that the DRX cycle may be common to multiple wireless devices, e.g., as a common DRX cycle. For example, a common DRX cycle may be common to all wireless devices in a cell for NB-IOT. Or, the DRX cycle may be specific to the wireless device (e.g., as a device-specific DRX cycle).

Regardless of how the timing of the reference signal is structured (e.g., on a search space granularity or a DRX cycle granularity), the method of FIG. 2B and/or FIG. 2C in some embodiments allow a sparser occurrence of the reference signal than every search space or DRX cycle. This may be the case for instance where the reference signal is transmitted on a non-anchor carrier in the system. The embodiments may attain sparser reference signal occurrence in this case by for instance exploiting reference signal measurement on an anchor carrier for a wireless device's primary estimation of downlink signal strength or quality and relying on reference signal measurement on a non-anchor carrier simply for verification of the anchor carrier based estimate.

Figure 3A:
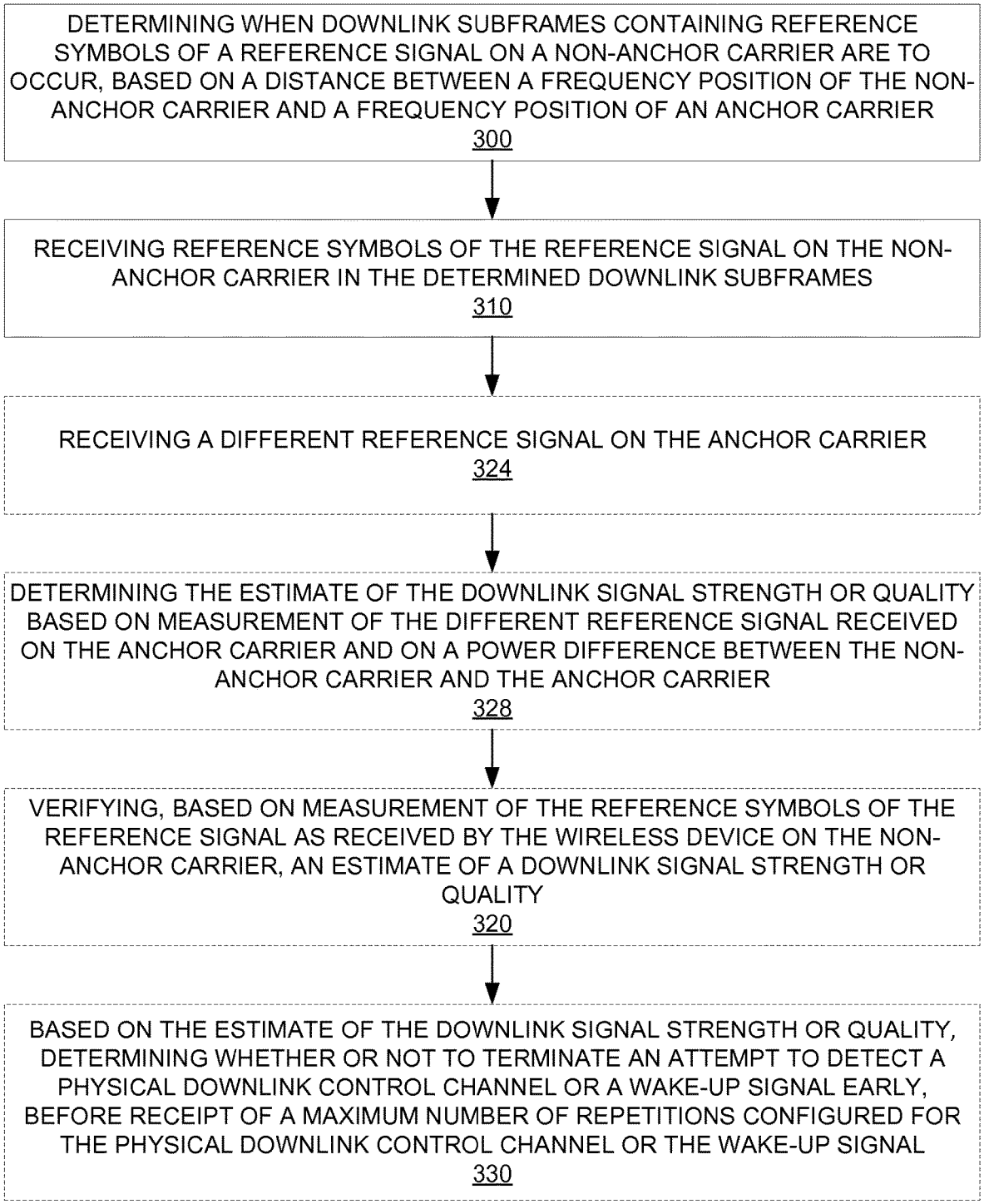
FIG. 3A is a logic flow diagram of a method performed by a wireless device according to other embodiments.

FIG. 3A depicts a method performed by a wireless device configured for use in a wireless communication system (e.g., an NB-IOT system) in accordance with yet other particular embodiments. The method as shown may include determining when downlink subframes containing reference symbols of a reference signal (e.g., NRS) on a non-anchor carrier are to occur, based on a distance between a frequency position of the non-anchor carrier and a frequency position of an anchor carrier (Block 300). Although not shown, the wireless device may receive assistance in this regard by receiving signaling from a network node indicating the frequency position of the non-anchor carrier and/or the anchor carrier. Regardless, the method as shown may also include receiving reference symbols of the reference signal on the non-anchor carrier in the determined downlink subframes (Block 310).

More particularly in this regard, downlink subframes containing reference symbols may be farther apart in time (i.e., sparser) the closer the frequency position of the non-anchor carrier is to the frequency position of the anchor carrier, and vice versa. The reference symbols may for instance be sparser in the sense that they are received before and/or during every K discontinuous reception, DRX, cycle of the wireless device, where K≥2, rather than every DRX cycle. Or, as another example, the reference symbols may be sparser in the sense that they are received before and/or during every L occurrence of a physical downlink control channel search space of the wireless device, wherein L≥2, rather than every search space occurrence. No matter the particular time structure of the reference symbols' occurrence, though, such may reflect for instance that downlink signal estimates on the anchor carrier may more accurately be converted into downlink signal estimates on the non-anchor carrier when the carriers are closer together in frequency, which may in turn mean that fewer or sparser reference symbols are needed on the non-anchor carrier to verify the accuracy of the converted downlink signal estimates.

The method in these and other embodiments therefore may further include receiving a different reference signal on the anchor carrier (Block 324) and determining the estimate of the downlink signal strength or quality based on measurement of the different reference signal received on the anchor carrier and on a power difference between the non-anchor carrier and the anchor carrier (Block 328). The method may then include verifying, based on measurement of the reference symbols of the reference signal as received by the wireless device on the non-anchor carrier, the estimate of a downlink signal strength or quality (Block 320). The method may further include, based on the estimate of the downlink signal strength or quality, determining whether or not to terminate an attempt to detect a physical downlink control channel or a wake-up signal early, before receipt of a maximum number of repetitions configured for the physical downlink control channel or the wake-up signal (Block 330).

FIG. 3B illustrates a related method performed by a network node configured for use in a wireless communication system (e.g., an NB-IOT system) in accordance with other particular embodiments. The method as shown includes configuring a pattern of downlink subframes that are to each contain reference symbols of a reference signal (e.g., NRS) on a non-anchor carrier, based on a distance between a frequency position of the non-anchor carrier and a frequency position of an anchor carrier (Block 340). Again in this regard, downlink subframes containing reference symbols may be farther apart in time (i.e., sparser) the closer the frequency position of the non-anchor carrier is to the frequency position of the anchor carrier, and vice versa. The reference symbols may for instance be sparser in the sense that they are transmitted before and/or during every K discontinuous reception, DRX, cycle of the wireless device, where K≥2, rather than every DRX cycle. Or, as another example, the reference symbols may be sparser in the sense that they are transmitted before and/or during every L occurrence of a physical downlink control channel search space of the wireless device, wherein L≥2, rather than every search space occurrence. No matter the particular time structure of the reference symbols' occurrence, though, such may reflect for instance that downlink signal estimates on the anchor carrier may more accurately be converted into downlink signal estimates on the non-anchor carrier when the carriers are closer together in frequency, which may in turn mean that fewer or sparser reference symbols are needed on the non-anchor carrier to verify the accuracy of the converted downlink signal estimates.

In any event, the method in FIG. 3B may further include transmitting signaling indicating the configured pattern and/or transmitting the reference symbols of the reference signal in the configured pattern of downlink subframes on the non-anchor carrier (Block 350). The method as shown in some embodiments also includes transmitting a different reference signal (e.g., NRS or CRS) on the anchor carrier (Block 360) and/or transmitting signaling indicating the frequency position of the non-anchor carrier (Block 370).

Figure 4B:
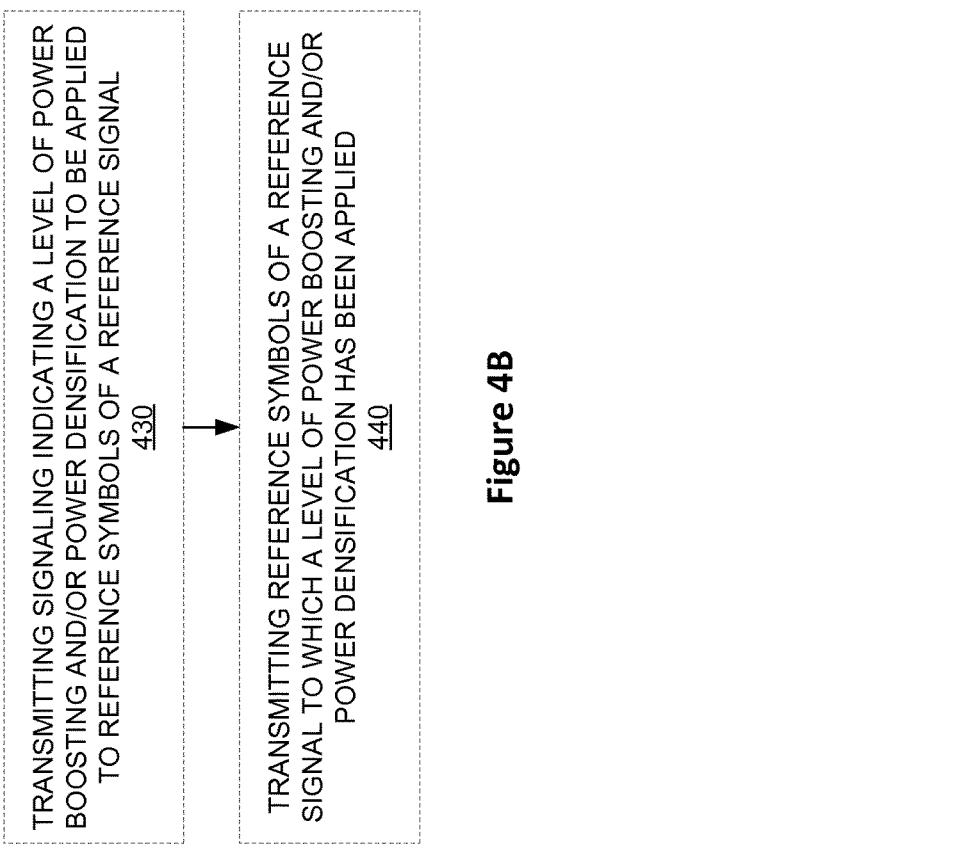
FIG. 4B is a logic flow diagram of a method performed by a network node according to still other embodiments.
Figure 4A:
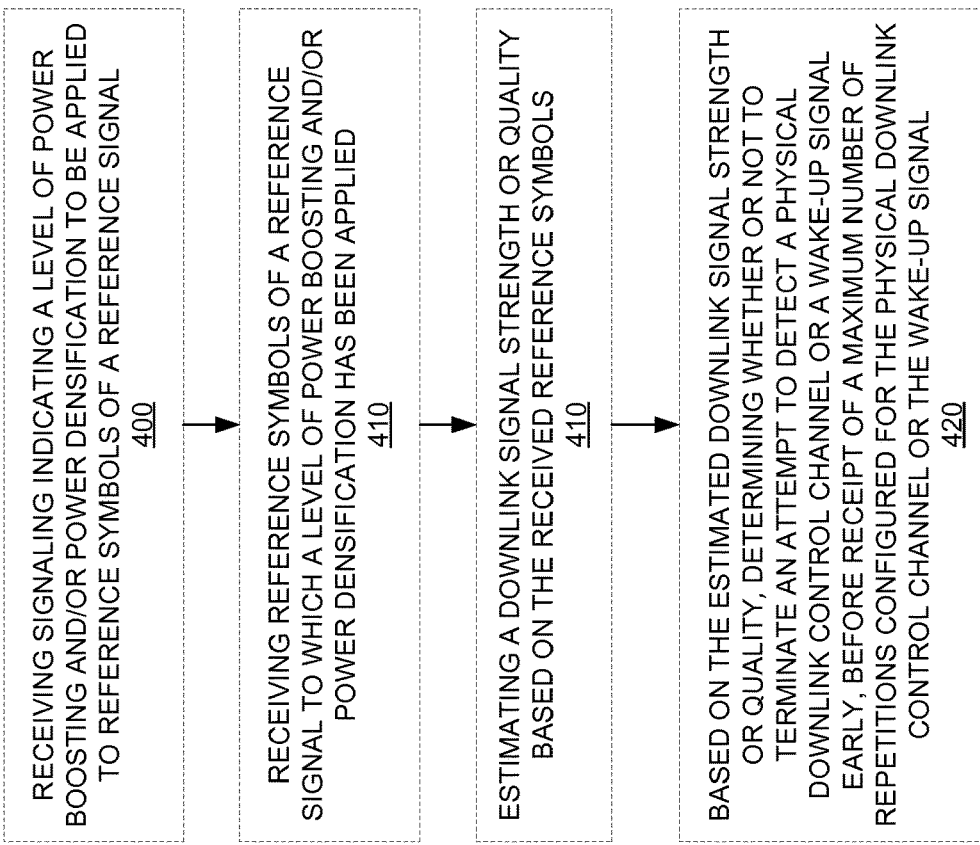
FIG. 4A is a logic flow diagram of a method performed by a wireless device according to still other embodiments.

FIG. 4A depicts a method performed by a wireless device configured for use in a wireless communication system (e.g., an NB-IOT system) in accordance with yet other particular embodiments. The method as shown may include receiving signaling indicating a level of power boosting and/or power densification to be applied to reference symbols of a reference signal (e.g., NRS) (Block 400). Alternatively or additionally, the method may include receiving reference symbols of a reference signal (e.g., NRS) to which a level of power boosting and/or power densification has been applied (Block 410). Such power boosting and/or power densification may enable the wireless device to perform more efficient and/or more reliable downlink signal strength or quality estimation. The method in this regard may further include estimating a downlink signal strength (e.g., RSRP) or quality (e.g., SINR) from the reference symbols of the reference signal (Block 410). The method may then include, based on the estimated downlink signal strength or quality, determining whether or not to terminate an attempt to detect a physical downlink control channel or a wake-up signal early, before receipt of a maximum number of repetitions configured for the physical downlink control channel or the wake-up signal (Block 420).

FIG. 4B illustrates a related method performed by a network node configured for use in a wireless communication system (e.g., an NB-IOT system) in accordance with other particular embodiments. The method as shown includes transmitting signaling indicating a level of power boosting and/or power densification to be applied to reference symbols of a reference signal (e.g., NRS) (Block 430). Alternatively or additionally, the method may include transmitting reference symbols of a reference signal (e.g., NRS) to which a level of power boosting and/or power densification has been applied (Block 440). Such power boosting and/or power densification may enable a wireless device to perform more efficient and/or more reliable downlink signal strength or quality estimation.

Figure 5B:
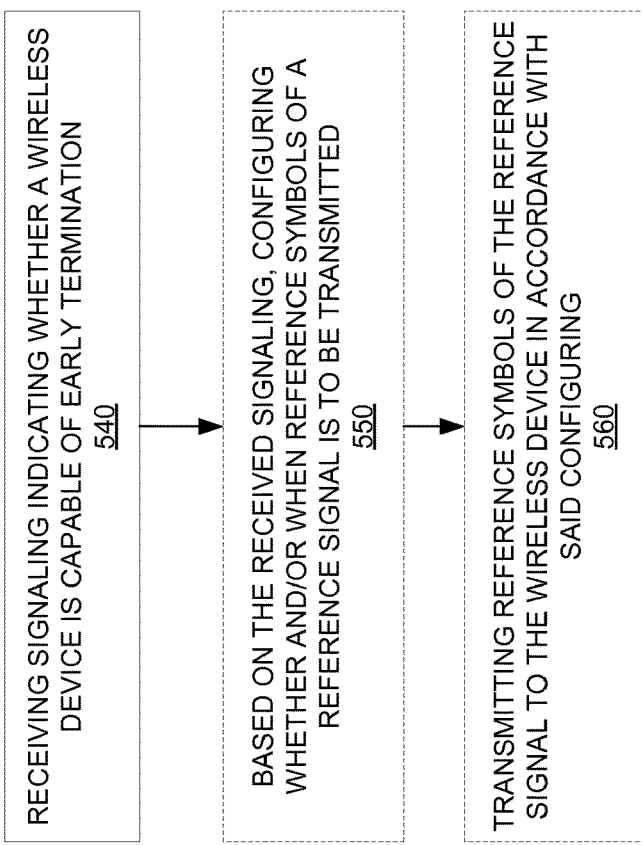
FIG. 5B is a logic flow diagram of a method performed by a network node according to yet other embodiments.
Figure 5A:
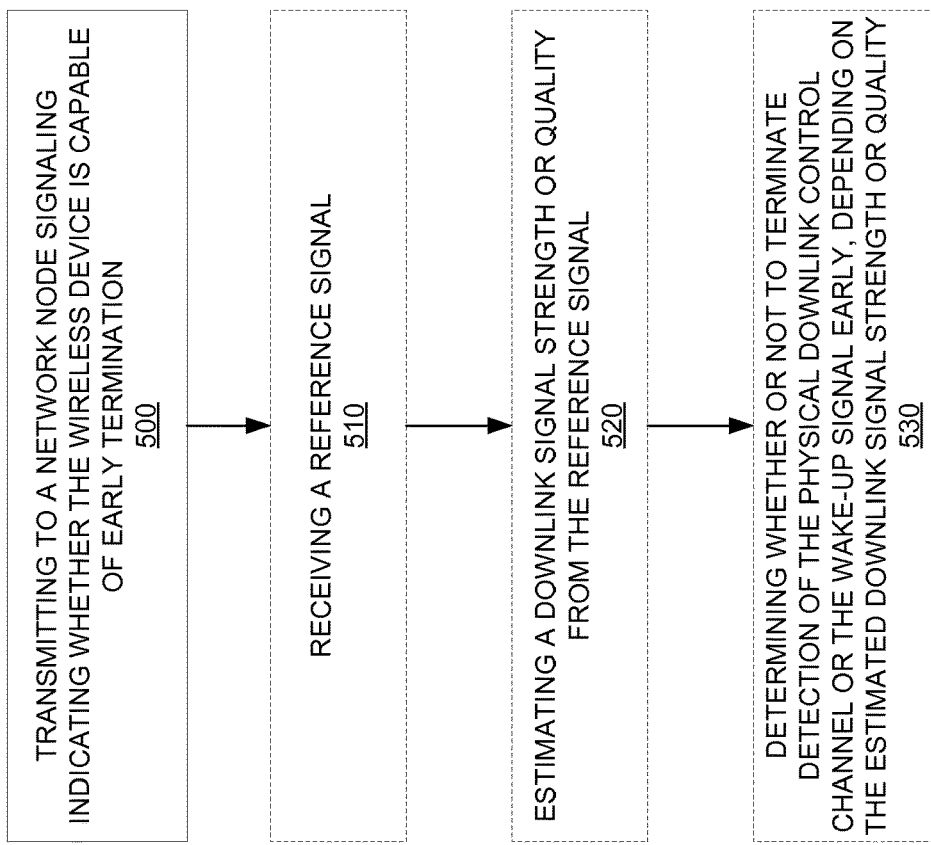
FIG. 5A is a logic flow diagram of a method performed by a wireless device according to yet other embodiments.

FIG. 5A depicts a method performed by a wireless device configured for use in a wireless communication system (e.g., an NB-IOT system) in accordance with still other embodiments. The method includes transmitting to a network node signaling indicating whether the wireless device is capable of early termination (Block 500). Early termination in this regard may comprise termination of an attempt to detect a physical downlink control channel or a wake-up signal before receipt of a maximum number of repetitions configured for the physical downlink control channel or the wake-up signal. In some embodiments, the signaling indicates that the wireless device is capable of early termination.

In some embodiments, such as when the signaling indicates that the wireless device is capable of early termination, the method may further include receiving a reference signal (e.g., a narrowband reference signal, NRS) (Block 510), estimating a downlink signal strength or quality from the reference signal (Block 520), and determining whether or not to terminate detection of the physical downlink control channel or the wake-up signal early, depending on the estimated downlink signal strength or quality (Block 130).

FIG. 5B depicts a related method performed by a network node configured for use in a wireless communication system (e.g., an NB-IOT system) in accordance with particular embodiments. The method includes receiving signaling indicating whether a wireless device is capable of early termination (Block 540). Early termination in this regard may comprise termination of an attempt to detect a physical downlink control channel or a wake-up signal before receipt of a maximum number of repetitions configured for the physical downlink control channel or the wake-up signal. The signaling may for instance be received from the wireless device itself, or from another network node (e.g., such as a radio network node to which the wireless device transmitted the signaling). Receiving the signaling with regard to the wireless device may be performed as part of receiving similar signaling with respect to one or more other wireless devices. In some embodiments, the signaling indicates that the wireless device is capable of early termination.

In some embodiments, the signaling is received from the wireless device. In other embodiments, the signaling is received from another network node. In either case, the method in some embodiments may further include transmitting signaling to another network node indicating whether (or that) the wireless device is capable of early termination.

In any event, the method in some embodiments may further include, based on the received signaling, configuring whether and/or when reference symbols of a reference signal (e.g., NRS) is to be transmitted (Block 550). Reference symbols of the reference signal may for instance be configured to not be transmitted, or not be transmitted as often, if the wireless device (or a certain minimum number or portion of wireless device served by the network node) is not capable of early termination. This may minimize or reduce signaling overhead when the signaling's transmission is of little or no use. In one or more embodiments in this regard, the method may entail receiving, for each of one or more other wireless devices served by the network node, signaling indicating whether the other wireless device is capable of early termination; determining, based on the received signaling, whether a minimum number of wireless devices served by the network node are capable of early termination; and configuring a reference signal to be transmitted or to not be transmitted, depending respectively on whether or not the minimum number of wireless devices served by the network node are capable of early termination.

Regardless, the method in some embodiments alternatively or additionally includes transmitting reference symbols of the reference signal to the wireless device in accordance with said configuring (Block 560).

Figures 6A, 6B:
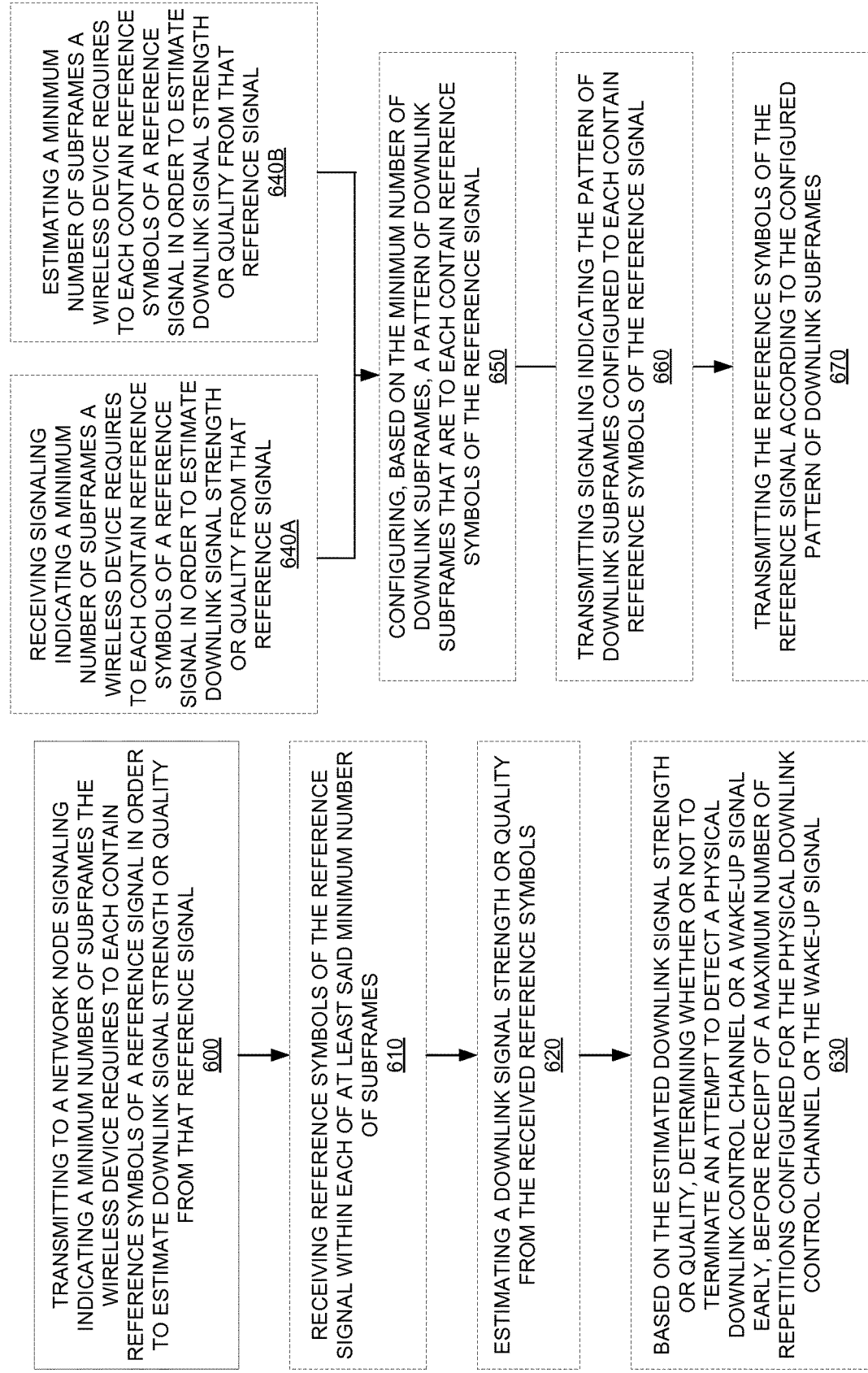
FIG. 6A is a logic flow diagram of a method performed by a wireless device according to other embodiments.
FIG. 6B is a logic flow diagram of a method performed by a network node according to other embodiments.

FIG. 6A depicts a method performed by a wireless device configured for use in a wireless communication system (e.g., an NB-IOT system) in accordance with other particular embodiments. The method as shown includes transmitting to a network node signaling indicating a minimum number of subframes the wireless device requires to each contain reference symbols of a reference signal (e.g., NRS) in order to estimate downlink signal strength or quality from that reference signal (Block 600).

For example, the signaling may indicate a minimum number of contiguous subframes the wireless device requires to each contain reference symbols of the reference signal in order to estimate downlink signal strength or quality from that reference signal. Alternatively or additionally, the signaling may indicate a minimum number of subframes the wireless device requires to each contain reference symbols of a reference signal in order to estimate from that reference signal downlink signal strength or quality within a certain range. In one such embodiment, the certain range includes downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal. In other embodiments, the signaling indicates, for each of different ranges of downlink signal strengths or qualities, a minimum number of subframes the wireless device requires to each contain reference symbols of the reference signal in order to estimate from that reference signal downlink signal strength or quality within that range.

In any event, the method in some embodiments further comprises receiving reference symbols of the reference signal within each of at least said minimum number of subframes (Block 610), estimating a downlink signal strength or quality from the received reference symbols (Block 620); and based on the estimated downlink signal strength or quality, determining whether or not to terminate an attempt to detect a physical downlink control channel or a wake-up signal early, before receipt of a maximum number of repetitions configured for the physical downlink control channel or the wake-up signal (Block 630).

FIG. 6B illustrates a related method performed by a network node configured for use in a wireless communication system (e.g., an NB-IOT system) in accordance with other particular embodiments. The method as shown includes determining a minimum number of downlink subframes that a wireless device requires to each contain reference symbols of a reference signal (e.g., NRS) in order for the wireless device to estimate a downlink signal strength or quality from that reference signal, either by receiving signaling indicating that minimum number (Block 640A) or by estimating that minimum number (Block 640B). In some embodiments, the minimum number is a minimum number of downlink subframes that a certain percentage of wireless devices served by the network node require each contain reference symbols of a reference signal in order for the wireless device to estimate a downlink signal strength or quality from that reference signal. Alternatively or additionally, in some embodiments the minimum number of subframes is the minimum number of subframes that the wireless devices requires to each contain reference symbols of a reference signal in order for the wireless device to estimate from the reference signal a downlink signal strength or quality within a certain range. In one such embodiment, the certain range includes downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal.

Regardless, in some embodiments, the method further includes configuring, based on the minimum number of downlink subframes, a pattern of downlink subframes that are to each contain reference symbols of the reference signal. For example, the network node may configure the pattern of downlink subframes to include at least the minimum number of downlink subframes, to include only the minimum number of downlink subframes, or to include no more than a certain number of downlink subframes above the minimum number.

In any event, the method as shown may further include transmitting the reference symbols of the reference signal according to the configured pattern of downlink subframes (Block 660). Alternatively or additionally, the method may include transmitting signaling indicating the pattern of downlink subframes configured to each contain reference symbols of the reference signal (Block 670).

Figure 7A:
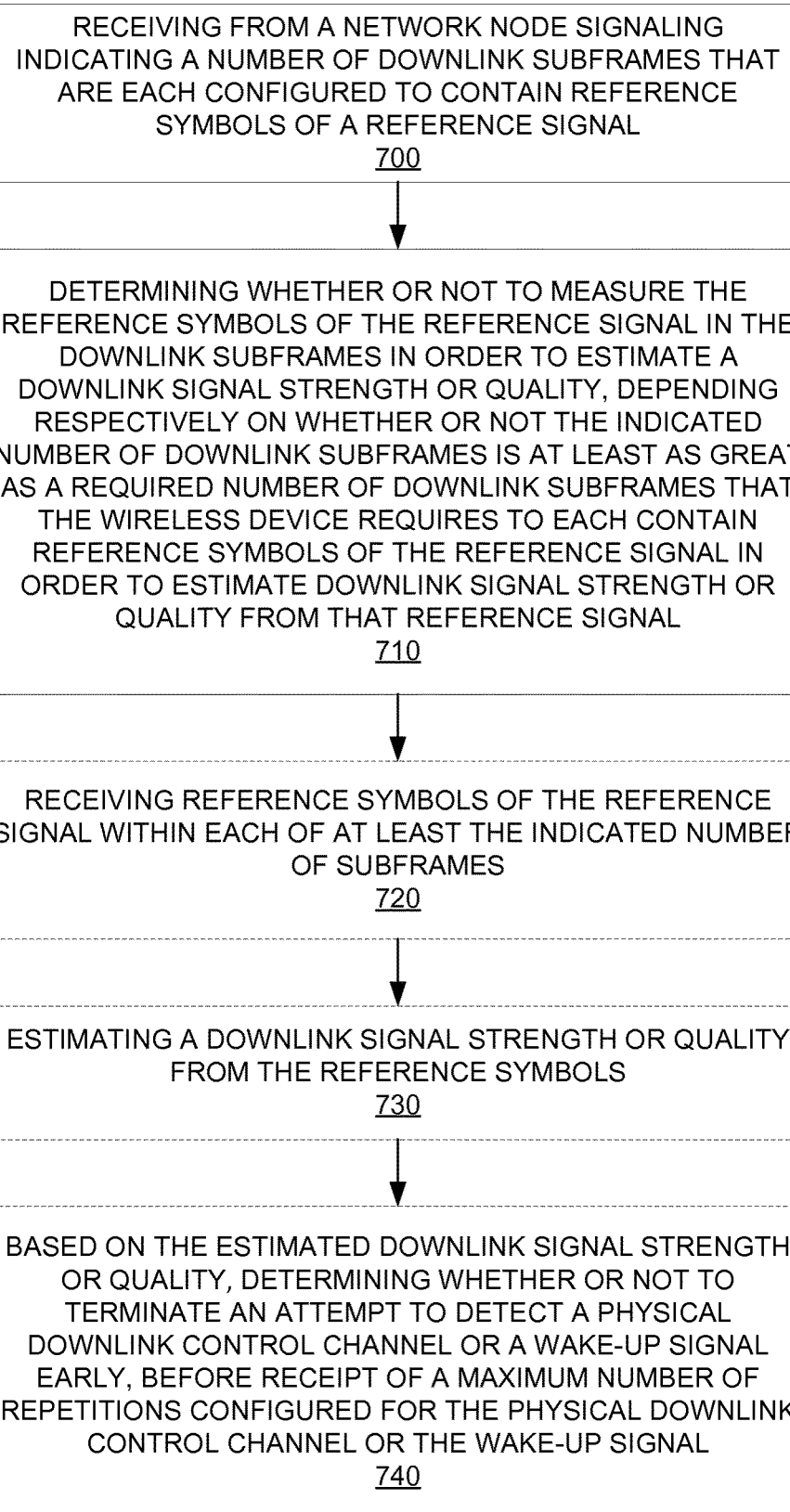
FIG. 7A is a logic flow diagram of a method performed by a wireless device according to yet other embodiments.

FIG. 7A depicts a method performed by a wireless device configured for use in a wireless communication system (e.g., an NB-IOT system) in accordance with still other particular embodiments. The method as shown includes receiving from a network node signaling indicating a number of downlink subframes that are each configured to contain reference symbols of a reference signal (e.g., NRS) (Block 700). The signalling may for instance indicate that each of 10 or fewer downlink subframes, 7 or fewer downlink subframes, 5 or fewer downlink subframes, or 3 or fewer downlink subframes, prior to the physical downlink control channel search space, are configured to contain reference symbols of the reference signal. This signaling may indicate the number of downlink subframes for instance by indicating a pattern of downlink subframes that are each configured to contain reference symbols of the reference signal.

In some embodiments, the signaling indicates each of the first L downlink subframes within a physical downlink control channel search space of the wireless device are configured to contain reference symbols of the reference signal, where L=Rmax/K, where K=1, 2, 3 . . . , 2048 and Rmax is a maximum number of repetitions configured for the physical downlink control channel or the wake-up signal, wherein the signaling indicates either L or K. In other embodiments, the signaling indicates each of the first L downlink subframes within a physical downlink control channel search space of the wireless device are configured to contain reference symbols of the reference signal, where L=a*Rmax, where a=1/(1, 2, 3 . . . , 2048) and Rmax is a maximum number of repetitions configured for the physical downlink control channel or the wake-up signal, wherein the signaling indicates either L or a. Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

Regardless, the method as shown also includes determining whether or not to measure the reference symbols of the reference signal in the downlink subframes in order to estimate a downlink signal strength or quality, depending respectively on whether or not the indicated number of downlink subframes is at least as great as a required number of downlink subframes that the wireless device requires to each contain reference symbols of the reference signal in order to estimate downlink signal strength or quality from that reference signal (Block 710).

In some embodiments, for instance, the required number of downlink subframes is a number of downlink subframes that the wireless device requires to each contain reference symbols of the reference signal in order to estimate from the reference signal downlink signal strength or quality within a certain range. This certain range may include downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal.

Regardless, the method as shown may also include (e.g., responsive to determining to measure the reference symbols of the reference signal in the downlink subframes) receiving reference symbols of the reference signal within each of at least the indicated number of subframes (Block 720), estimating a downlink signal strength or quality from the reference symbols (Block 730); and, based on the estimated downlink signal strength or quality, determining whether or not to terminate an attempt to detect a physical downlink control channel or a wake-up signal early, before receipt of a maximum number of repetitions configured for the physical downlink control channel or the wake-up signal (Block 740).

Figure 7B:
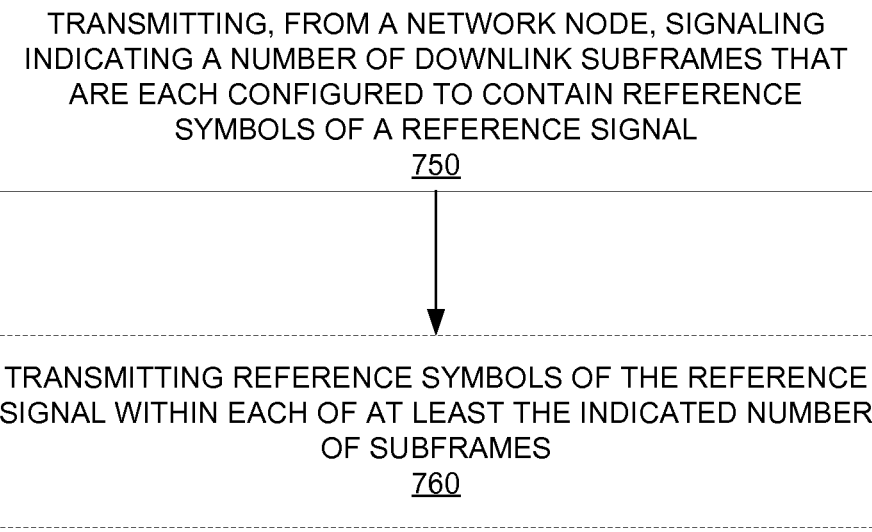
FIG. 7B is a logic flow diagram of a method performed by a network node according to yet other embodiments.

FIG. 7B depicts a method performed by a network node configured for use in a wireless communication system (e.g., an NB-IOT system) in accordance with still other particular embodiments. The method as shown includes transmitting, from the network node, signaling indicating a number of downlink subframes that are each configured to contain reference symbols of a reference signal (e.g., NRS) (Block 750). The signalling may for instance indicate that each of 10 or fewer downlink subframes, 7 or fewer downlink subframes, 5 or fewer downlink subframes, or 3 or fewer downlink subframes, prior to the physical downlink control channel search space, are configured to contain reference symbols of the reference signal. This signaling may indicate the number of downlink subframes for instance by indicating a pattern of downlink subframes that are each configured to contain reference symbols of the reference signal.

In some embodiments, the signaling indicates each of the first L downlink subframes within a physical downlink control channel search space of the wireless device are configured to contain reference symbols of the reference signal, where L=Rmax/K, where K=1, 2, 3 . . . , 2048 and Rmax is a maximum number of repetitions configured for the physical downlink control channel or the wake-up signal, wherein the signaling indicates either L or K. In other embodiments, the signaling indicates each of the first L downlink subframes within a physical downlink control channel search space of the wireless device are configured to contain reference symbols of the reference signal, where L=a*Rmax, where a=1/(1, 2, 3 . . . , 2048) and Rmax is a maximum number of repetitions configured for the physical downlink control channel or the wake-up signal, wherein the signaling indicates either L or a. Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

Regardless, the method as shown may also include transmitting reference symbols of the reference signal within each of at least the indicated number of subframes (Block 760).

Figure 8A:
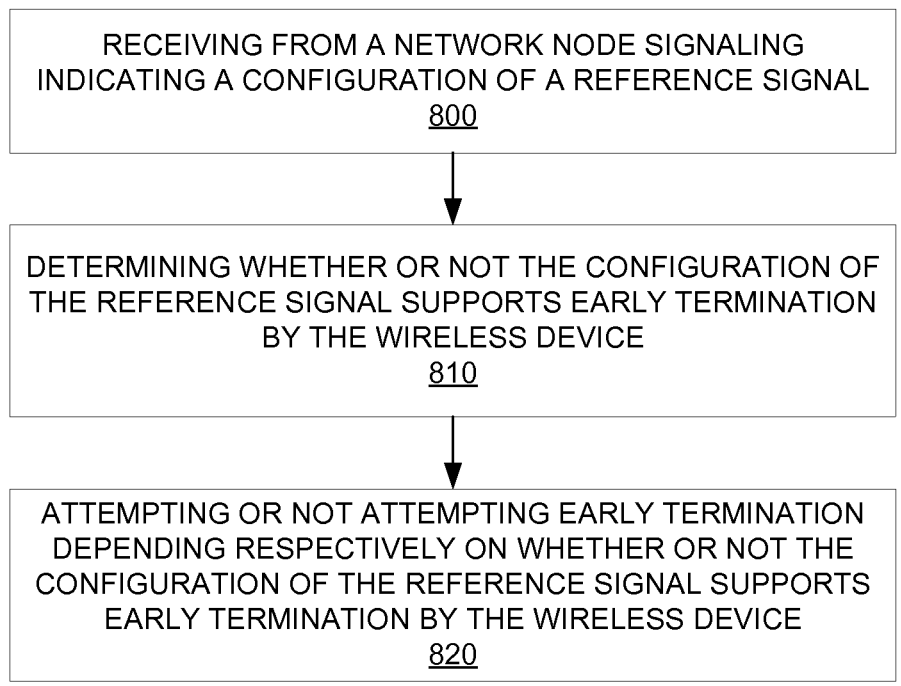
FIG. 8A is a logic flow diagram of a method performed by a wireless device according to still other embodiments.

FIG. 8A depicts a method performed by a wireless device configured for use in a wireless communication system (e.g., an NB-IOT system) in accordance with yet other particular embodiments. The method as shown includes receiving from a network node signaling indicating a configuration of a reference signal (e.g., NRS), e.g., in terms of a pattern of or number of downlink subframes that are each configured to contain reference symbols of the reference signal (Block 800). The method also includes determining whether or not the configuration of the reference signal supports early termination by the wireless device (Block 810). Here, early termination may comprise termination of an attempt to detect a physical downlink control channel or a wake-up signal before receipt of a maximum number of repetitions configured for the physical downlink control channel or the wake-up signal.

In some embodiments such as where the configuration of the reference signal includes configuration of a number of downlink subframes that are to each contain reference symbols of the reference signal, determining whether or not the configuration of the reference signal supports early termination by the wireless device comprises respectively determining whether or not the number of downlink subframes that are to each contain reference symbols of the reference signal according to the configuration is at least as great as a required number of downlink subframes that the wireless device requires in order to estimate downlink signal strength or quality from that reference signal. In one such embodiment, the required number of downlink subframes is a number of downlink subframes that the wireless device requires in order to estimate from the reference signal downlink signal strength or quality within a certain range. This certain range may for instance include downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal.

In any event, the method further includes attempting or not attempting early termination depending respectively on whether or not the configuration of the reference signal supports early termination by the wireless device (Block 420). For instance, if the configuration of the reference signal does not support early termination, the wireless device may not measure the reference signal and/or may not check for whether detection can be terminated early, e.g., such that the wireless device necessarily uses all of the maximum number of repetitions in its detection attempt. In these and other embodiments, then, attempting early termination may comprise receiving reference symbols of the reference signal according to the indicated configuration; estimating a downlink signal strength or quality from the reference symbols; and based on the estimated downlink signal strength or quality, determining whether or not to terminate an attempt to detect a physical downlink control channel or a wake-up signal early, before receipt of a maximum number of repetitions configured for the physical downlink control channel or the wake-up signal.

FIG. 8B depicts a method performed by a wireless device configured for use in a wireless communication system (e.g., an NB-IOT system) in accordance with yet other particular embodiments. The method as shown includes receiving one or more reference symbols of a reference signal (e.g., NRS) within each of 10 or fewer downlink subframes prior to a physical downlink control channel search space of the wireless device, and/or within each downlink subframe of an initial portion of the physical downlink control channel search space (Block 830). Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

The method may also include estimating a downlink signal strength or quality based on the received reference symbols (Block 840). As shown, in some embodiments, the method may also comprise, based on the estimated downlink signal strength or quality, determining whether or not to terminate an attempt to detect a physical downlink control channel or a wake-up signal early, before receipt of a maximum number of repetitions configured for the physical downlink control channel or the wake-up signal (Block 850).

In some embodiments, one or more reference symbols of the reference signal are received within each of X or fewer downlink subframes prior to a physical downlink control channel search space of the wireless device, where X may for instance be 7, 5, 3, or some other fixed or configurable number. Alternatively or additionally, the initial portion in some embodiments comprises L downlink subframes, where L=Rmax/K, where K=1, 2, 3 . . . , 2048 and Rmax is a maximum number of repetitions configured for the physical downlink control channel or the wake-up signal. In other embodiments, the initial portion comprises L downlink subframes, where L=a*Rmax, where a=1/(1, 2, 3 . . . , 2048) and Rmax is a maximum number of repetitions configured for the physical downlink control channel or the wake-up signal. Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

FIG. 8C illustrates a related method performed by a network node configured for use in a wireless communication system (e.g., an NB-IOT system) in accordance with other particular embodiments. The method as shown includes transmitting one or more reference symbols of a reference signal within each of 10 or fewer downlink subframes prior to a physical downlink control channel search space of the wireless device, and/or within each downlink subframe of an initial portion of the physical downlink control channel search space (Block 860). Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

In some embodiments, one or more reference symbols of the reference signal are transmitted within each of X or fewer downlink subframes prior to a physical downlink control channel search space of the wireless device, where X may for instance be 7, 5, 3, or some other fixed or configurable number. Alternatively or additionally, the initial portion in some embodiments comprises L downlink subframes, where L=Rmax/K, where K=1, 2, 3 . . . , 2048 and Rmax is a maximum number of repetitions configured for the physical downlink control channel or the wake-up signal. In other embodiments, the initial portion comprises L downlink subframes, where L=a*Rmax, where a=1/(1, 2, 3 . . . , 2048) and Rmax is a maximum number of repetitions configured for the physical downlink control channel or the wake-up signal. Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

The method may alternatively or additionally include transmitting signaling indicating a number of downlink subframes that are configured to each contain reference symbols of a reference signal (Block 870). In some embodiments, the signaling indicates each of X or fewer downlink subframes prior to a physical downlink control channel search space of the wireless device are configured to each contain reference symbols of the reference signal, where X may be 7, 5, 3, or some other fixed or configurable number. Alternatively or additionally, the signaling may indicate the first L downlink subframes within a physical downlink control channel search space of the wireless device are configured to each contain reference symbols of the reference signal, where L=Rmax/K, where K=1, 2, 3 . . . . , 2048 and Rmax is a maximum number of repetitions configured for the physical downlink control channel or the wake-up signal. In such a case, the signaling may indicate either L or K. Alternatively or additionally, the signaling may indicate the first L downlink subframes within a physical downlink control channel search space of the wireless device are configured to each contain reference symbols of the reference signal, where L=a*Rmax, where a=1/(1, 2, 3 . . . , 2048) and Rmax is a maximum number of repetitions configured for the physical downlink control channel or the wake-up signal. Here, the signaling may indicate either L or a. Note in this regard that the physical downlink control channel search space may be common to multiple wireless devices, e.g., as a common search space. For example, a common search space may be common to all wireless devices in a cell that monitor the same paging occasion). Or, the physical downlink control channel search space may be specific to the wireless device (e.g., as a device-specific search space).

Note that any of the above embodiments may apply even in instances where no page is transmitted to or received by the wireless device (e.g., NRS may be transmitted no matter whether a page is transmitted to or received by the wireless device in the device's paging occasion). In fact, some of the above embodiments in doing so enable the wireless device to exploit the reference signal (e.g., NRS) for early termination even when there is no paging transmitted. The embodiments may enable this while still tailoring reference signal transmission to the particular needs and capabilities of the wireless device(s), e.g., so as to minimize or reduce reference signal overhead.

Accordingly, in any of the above embodiments, the reference signal may be a narrowband reference signal, e.g., on a non-anchor carrier. Alternatively or additionally, the wireless communication system may be a narrowband internet-of-things (NB-IOT) system.

Note that any of the embodiments illustrated above may be implemented separately or in combination.

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
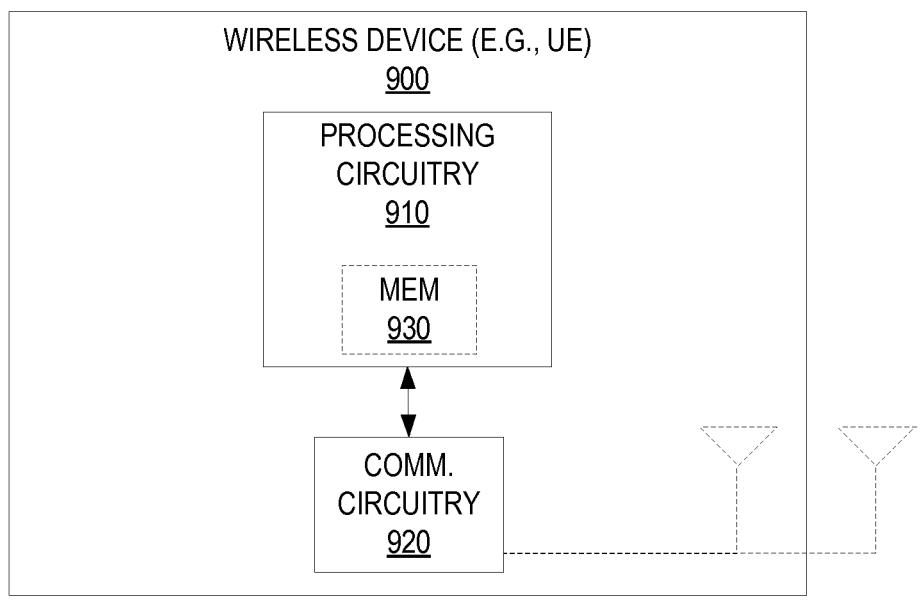
FIG. 9 is a block diagram of a wireless device according to some embodiments.

FIG. 9 for example illustrates a wireless device 900 (e.g., wireless device 12) as implemented in accordance with one or more embodiments. As shown, the wireless device 900 includes processing circuitry 910 and communication circuitry 920. The communication circuitry 920 (e.g., radio circuitry) is configured to transmit and/or receive information to and/or from one or more other nodes, e.g., via any communication technology. Such communication may occur via one or more antennas that are either internal or external to the wireless device 900. The processing circuitry 910 is configured to perform processing described above, such as by executing instructions stored in memory 930. The processing circuitry 910 in this regard may implement certain functional means, units, or modules.

Figure 10:
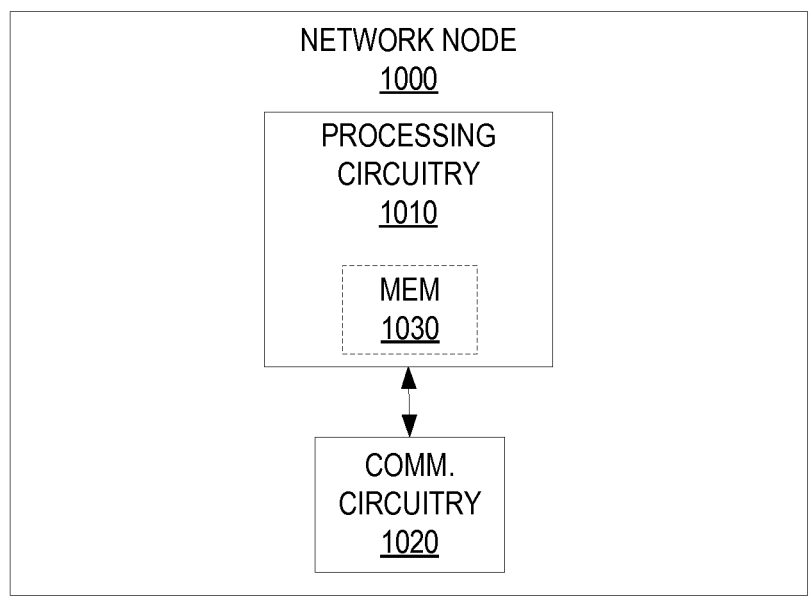
FIG. 10 is a block diagram of a network node according to some embodiments.

FIG. 10 illustrates a network node 1000 (e.g., network node 14) as implemented in accordance with one or more embodiments. As shown, the network node 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, such as by executing instructions stored in memory 1030. The processing circuitry 1010 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

In Release 13, the $3^{rd}$ generation partnership project (3GPP) developed narrowband internet of things (NB-IOT) and Long Term Evolution Category M1 (LTE-M). These new radio access technologies provide connectivity to services and applications demanding qualities such as reliable indoor coverage and high capacity in combination with low system complexity and optimized device power consumption.

To support reliable coverage in the most extreme situations both NB-IOT and LTE-M has the ability to perform link adaptation on all physical channels by means of sub-frame bundling and repetitions. In the downlink this applies to the physical downlink control channel (PDCCH), the narrowband PDCCH (NPDCCH), the physical downlink control channel (PDCCH), the machine type communication (MTC) PDCCH (MPDCCH), the physical downlink shared channel PDSCH, the narrowband PDSCH (NPDSCH). In the uplink, this applies to the physical uplink shared channel (PUSCH), the narrowband PUSCH (NPUSCH), the physical random access channel (PRACH), the narrowband PRACH (NPRACH), and the physical uplink control channel (only for LTE-M).

For Rel-16 enhancements for NB-IOT, it is desirable to improve the multicarrier operation by specifying signalling to indicate on a non-anchor carrier for paging a set of subframes which will contain NRS even when no paging NPDCCH is transmitted.

Recall that in Rel-14 for non-anchor paging, the NRS is only transmitted if there is a paging message. The intention was to minimize the network overhead and reduce interference as the paging load is not expected to be high in NB-IOT. Having an always-on NRS for paging on non-anchor carrier not only increases the energy costs for the operators but also causes unnecessary interference. Furthermore, as the LTE resource allocation is done via RBGs (Resource Block Groups), the presence of NRS would fragment LTE resource allocation and degrade the LTE performance if NB-IOT is deployed inband. Considering New Radio (NR) coexistence with NB-IOT, an always-on NRS is not desirable as it will require configuring additional reserved resources on the NR carrier.

However, from the UE perspective, the presence of NRS on a non-anchor carrier is very useful for the UE to carry out early termination for both NWUS and NPDCCH detections. To be more specific, when there is paging message transmitted, after the UE detects NWUS and/or NPDCCH, it can stop early. But when no paging message is transmitted, the UE must monitor until the maximum number of repetitions (e.g., Rmax) configured for the NWUS or NPDCCH transmission. If the UE can estimate the SINR based on NRS, if no paging is transmitted, after monitoring certain portion of the NWUS or NPDCCH transmission, the UE can safely conclude that there is no paging and does not need to monitor until the maximum number of repetitions configured for the NWUS or NPDCCH transmission. This can further improve the UE energy saving. Therefore, the eNB should only transmit NRS if it is certain that this can benefit some UEs, i.e., there are UEs that support early termination.

There currently exist certain challenge(s). Currently, since there is no NRS transmitted on the non-anchor carrier, the UE can only estimate the SINR based on the measurement on the anchor carrier. However, the radio environment for anchor and non-anchor may differ a lot due to various reasons, e.g., propagation environments. Hence, using the measurement on the anchor carrier as prior information for the decision of early terminating NPDCCH monitoring may result in significant errors.

Another way of performing NPDCCH decoding early termination when there is no paging to the UE is to compare the received energy with a predefined threshold. However, this may require the UE to observe the non-anchor carrier for quite a long time in order to achieve the confidence level.

Certain aspects of the present disclosure and their embodiments may provide solutions to these or other challenges. Some embodiments herein propose signaling and configuration methods for the network to enable NRS transmission based on the needs and capability of the UEs. This can both minimize the NRS transmissions at the network side, but also enable the UE for early terminating NPDCCH decoding when there is no paging transmitted.

Certain embodiments may provide one or more of the following technical advantage(s). Some embodiments provide methods for the network to minimize the NRS transmission, but still enable the UE to use the NRS to estimate SINR for early terminating NPDCCH decoding when there is no paging transmitted.

More particularly, in NB-IOT, the user equipment (UE) in radio resource control (RRC) idle mode wakes up at its configured paging occasions (POs) to monitor paging. The paging message is carried by the narrowband physical downlink shared channel (NPDSCH) which is scheduled by downlink control information (DCI) carried narrowband downlink control channel (NPDCCH). The UE first needs to try to decode the NPDCCH to identify whether there is a DCI that is scrambled by its assigned paging radio network temporary identity (P-RNTI). If it finds the DCI, the UE would continue to check the scheduled NPDSCH to see whether it is paged or not. If it does not find the DCI, the UE goes back to sleep and wakes up in the next PO to repeat the procedures.

NB-IOT supports up to 20 dB coverage extension comparing to LTE or GSM systems. The enhanced coverage is achieved via power boosting and excessive number of repetitions. The maximum number of repetitions of NPDCCH (Rmax) is 2048. If there is a DCI carried NPDCCH, it is easy for the UE to perform early NPDCCH decoding termination, as the UE can stop the decoding when it gets a CRC pass. However, if there is no DCI carried by NPDCCH (i.e., in the case nothing is being transmitted), the UE cannot easily perform early termination, as it does not know whether it is in a bad coverage, which requires the UE to accumulate enough energy to decode, or simply there is nothing being transmitted.

In order for the UE not to monitor paging until the configured Rmax (the maximum number of repetitions of NPDCCH configured by the network) on an NB-IoT carrier, in Rel15 wake-up signal (NWUS) is specified. The UE only needs to monitor NWUS, which is significantly shorter than Rmax, to determine whether it needs to monitor the subsequent paging or not. This can already achieve significant energy saving at the UE. Certainly, when NWUS is not detected, the UE does not need to monitor NPDCCH for paging. Early termination of NWUS detection can also provide energy saving at the UE. [2].

By estimating the downlink (DL) signal-to-interference-plus-noise ratio (SINR) by using a narrowband reference signal (NRS), the UE, at least in good coverage, can perform early termination of NPDCCH and NWUS when there is no paging transmitted. However, the problem is that in the current NB-IOT system, on the non-anchor, the UE can only assume there are NRSs when there is a paging DCI send from the network. To be more specific, in TS36.211, it specifies that "When an NB-IOT UE is configured by higher layers to decode NPDCCH with CRC scrambled by the P-RNTI, the UE may assume NRSs are transmitted in the NPDCCH candidate where the UE finds a DCI with CRC scrambled by the P-RNTI. The UE may also assume NRSs are transmitted 10 NB-IOT DL subframes before and 4 NB-IOT DL subframes after the NPDCCH candidate where the UE finds a DCI with CRC scrambled by the P-RNTI. If the DCI with CRC scrambled by the P-RNTI schedules a NPDSCH, the UE may assume NRSs are transmitted in the NB-IOT DL subframes carrying the NPDSCH as well as 4 NB-IOT DL subframes before and after the scheduled NPDSCH."

As discussed above, having an always on NRSs transmission has lots of drawbacks. Therefore, it is better to only transmit the NRSs when necessary. But on the other hand, the NRSs are needed by the UE to estimate the DL SINR to perform NPDCCH or NWUS early termination when no paging DCI is transmitted.

Notice that, in order for the UE not to monitor paging until the configured Rmax on an NB-IOT carrier, in Rel15 NWUS is specified. The UE only needs to monitor NWUS, which is significant shorter than Rmax, to determine whether it needs to monitor the subsequent paging or not. This can already achieve significant energy saving at the UE.

Certainly, when NWUS is not detected, the UE does not need to monitor NPDCCH for paging. Early termination of NWUS detection can also provide energy saving at the UE. As the purpose of transmitting NRS is to facilitate early termination of NWUS, the NRS should only be transmitted at the beginning portion of the WUS subframes to facilitate the UE to estimate the SINR.

When NWUS is not configured, i.e., the UE is configured to monitor NPDCCH for paging directly, the presence of NRS can help the UE to estimate the DL SINR and perform early termination of NPDCCH decoding to save energy. If paging is sent on the non-anchor carrier, NRSs may be present in 10 NB-IOT DL subframes prior the NPDCCH scrambled by P-RNTI and 4 NB-IOT DL subframes after the NPDCCH. The 10 NB-IOT DL subframes prior the NPDCCH is for the UE to warm up, perform measurements, and used for cross-subframe channel estimation.

Since power saving is only expected for UE in good coverage, it is expected that only a small amount of NB-IOT DL subframes are needed by the UE to estimate the SINR when paging is not transmitted. In order to have the behavior at the UE as there is a paging transmitted, at most 10 NB-IOT DL subframes prior the NPDCCH search space should be transmitted for the UE to estimate the SINR when paging is not transmitted. If 10 NB-IOT DL subframes are not enough, as the purpose is to facilitate early termination, the additional NRS should only be transmitted at the beginning portion of the NPDCCH search space. Notice that these subframes are only for UE to estimate the SINR that facilities the early termination. They are not expected to be used for other purposes, e.g., idle mode mobility measurement for cell selection or reselection.

In these and other embodiments, note that the NPDCCH search space may be defined as follows: An NPDCCH search space $NS_k^{(L',R)}$ at aggregation level $L' \in \{1,2\}$ and repetition level $R \in \{1,2,4,8,16,32,64,128,256,512,1024, 2048\}$ is defined by a set of NPDCCH candidates where each candidate is repeated in a set of R consecutive NB-IOT downlink subframes excluding subframes used for transmission of SI messages starting with subframe k.

Some embodiments propose the following to enable the network to minimize the NRS transmission, but it can still enable the UE to use the NRS to estimate SINR for early terminating NPDCCH decoding when there is no paging transmitted.

In the first embodiment, the UE is required to report its capability to the network that it supports early termination of NPDCCH and/or NWUS. The network (e.g., MME or AMF) would store this information and inform the eNBs in the tracking area of the UE about the UE capability.

In the second embodiment, together with the capability, the UE can also report its required number of (contiguous) NB-IOT DL subframes containing NRS for DL SINR measurements. The UE can also report a set of different number of (contiguous) NB-IOT DL subframes containing NRS for different SINR ranges. For example, at X dB SINR, the UE required N (contiguous) NB-IOT DL subframes containing NRS for reliable DL SINR measurement to perform early termination of NPDCCH and/or NWUS; at Y dB SINR, the UE required M (contiguous) NB-IOT DL subframes containing NRS for reliable DL SINR measurement to perform early termination of NPDCCH and/or NWUS. This allows different UE implementation.

In an alternate embodiment, the network can learn/estimate (machine learning) how many NRS (e.g., NRS reference symbols or subframes) is required for certain SINR or certain coverage extension (enhance coverage mode 1, enhance coverage mode 2). This can be based on the energy saving target both at the network side and from the number of UEs in the cell supporting the functionality and their (coverage) distributions.

In the third embodiment, the network, based on the information it gets from different UEs or from its own estimations, configures the transmission of the NB-IOT DL subframes containing NRS. For example, it can find the minimum common number that can satisfy P % of the UE in a cell or in a tracking area. And each eNB can broadcast the configuration in the system information (SI).

In the fourth embodiment, the UE checks the configuration in the SI. If the configured number of (contiguous) NB-IOT DL subframes containing NRS is sufficient for it to correctly estimate the SINR and perform early termination at the estimate the SINR, then the UE would perform early termination of NPDCCH or NWUS when there is no paging. If the UE determines that the configured number of (contiguous) NB-IOT DL subframes containing NRS does not give the reliable SINR estimation for early termination, e.g., based on the quality of the anchor carrier, or the quality of the SINR estimation, or decoding of other pervious channels, etc. then the UE still monitor NPDCCH until Rmax when there is no paging.

In one of the embodiments, at most 10 NB-IOT DL subframes prior the NPDCCH search space should be transmitted for the UE to estimate the SINR when paging is not transmitted.

In one of the embodiments, NRSs are only transmitted in beginning portion of the NPDCCH search space, denoted by L. And this is configured in terms of Rmax, e.g., L=Rmax/K, where K=1, 2, 3 . . . . , 2048, or L=a*Rmax, where a=1/(1, 2, 3 . . . . , 2048). Here L or a will be signaled in the SI.

In one of the embodiments, for inband deployment, the network can signal the configuration of LTE CRS on-anchor carrier. The UE can use LTE CRS to estimate the DL SINR and perform early termination of NPDCCH and/or NWUS.

Also, as mentioned before, in the inband deployment, it is better not to fragment the LTE resource allocation. One of the possibility is to place the non-anchor besides or close to the anchor carrier in the same RBG. More specifically, in an LTE system, in order to reduce the signaling overhead, the downlink resources are grouped into a RBG and the RBG is allocated for DL data transmission. Depending on the system bandwidth, the RBG size can be 1, 2, 3 or 4 resource blocks (RBs). For NB-IOT inband deployment, each carrier (either anchor or non-anchor) occupies one RB in the LTE system. However, as RBG defines the granularity of the DL resource allocation, i.e., multiple RBs are bundled together, in order not to fragment the DL resource allocation in LTE system, it is preferred to put the non-anchor carrier besides or close to the anchor carrier in the same RBG. If the non-anchor just besides or is close to the anchor carrier, the UE can use the anchor for estimation of SINR, and covert it with according to the power difference between anchor and non-anchor carrier. The UE may need to use some NRSs on the non-anchor carrier to verify the SINR, but much less NRSs subframes can be expected.

In one of the embodiments, the network can configure and send N subframes with NRS prior to every other (or every L) NPDCCH search spaces (and/or in the beginning portion of the NPDCCH search spaces), or every other (or every K) DRX cycles. The network sends the information to the UE in the SI.

In one of the embodiments, the position of the non-anchor carrier is signaled to the UE (explicitly or implicitly). The number of subframes containing NRSs depends on the distance between the non-anchor carrier to the anchor carrier. That is, if the non-anchor carrier is close to the anchor carrier, less NRSs are needed and vice versa.

In one of the embodiments, the network power boosts the NRS transmitted for the purpose of SINR estimation. For example, the NRS may be transmitted at a higher power than the data channel or the NRS is transmitted at a higher power than its regular power level when used together with NPDCCH and/or NPDSCH. This will enable the UE to perform more efficient, and more reliable SINR estimation. The level of power boosting is signaled from the network to the UE.

In one of the embodiments, the network power densifies the transmitted NRS configuration. The densification means that extra resource elements are used for reference symbol transmissions. Again this will enable the UE to perform more efficient, and more reliable SINR estimation. The densified NRS configuration is signaled from the network to the UE.

Figure 11:
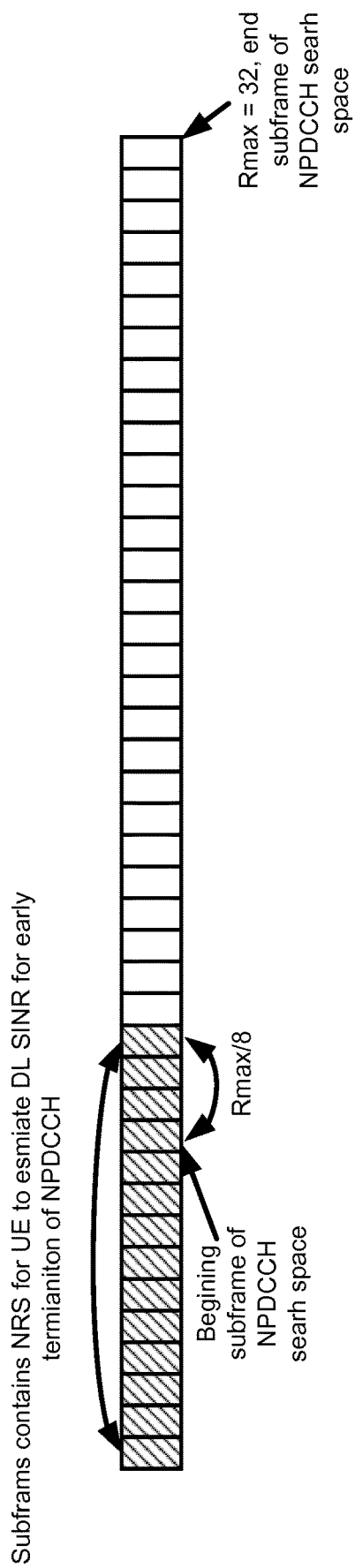
FIG. 11 is a block diagram of transmittal of a reference signal according to some embodiments.

A non-exclusive illustration of some embodiments is given in FIG. 11. In this example, there is no NPDCCH transmitted. Assume Rmax=32, and 4 NB-IOT DL subframes at the beginning of the NPDCCH search space are configured with NRS. Ten NB-IOT DL subframes are configured with NRS prior the NPDCCH search space.

A non-exclusive UE capability signaling is given in FIGS. 12A and 12B based upon 36.331 v15.2.2 In this example, UE reports its early termination capability to the Network.

In view of the above, according to some embodiments herein a UE may signal its capability of early termination to assist the eNB to decide whether to turn on the NRS transmission on non-anchor carrier to assist the UE for early termination.

Further observe that the significant energy saving for early termination only occurs when the UE is in good coverage and when Rmax is large. For UE in MCL larger than 154 dB, the gain is not so obvious. Accordingly, early termination may not provide noticeable gain for UEs when the MCL is large.

As the purpose of transmitting NRS is to facilitate early termination of WUS, the NRS in some embodiments is only transmitted at the beginning portion of the WUS subframes to facilitate the UE to estimate the SINR. Thus, some embodiments do not require signalling support to indicate the presence of NRS on an NB-IOT carrier where WUS is configured.

In some embodiments, when WUS is not configured, at most 10 NB-IOT DL subframes prior to the NPDCCH search space are transmitted for the UE to perform SINR estimation for early termination. If 10 NB-IOT DL subframes are not enough, additional NRSs may only be transmitted at the beginning portion, which should be significantly smaller than Rmax, of the NPDCCH search space to facilitate the UE to estimate the SINR. Otherwise, the UE can simply monitor the entire configured NPDCCH search space.

In some inband configurations, much less NRS density can be expected, i.e., NRSs can be associated to every L NPDCCH search spaces. In some embodiments, then, the eNB can configure to send NRSs associating to every L NPDCCH search spaces. Furthermore, for inband operation, CRSs can also be used to estimate the SINR to facilitate the early termination.

Figure 13:
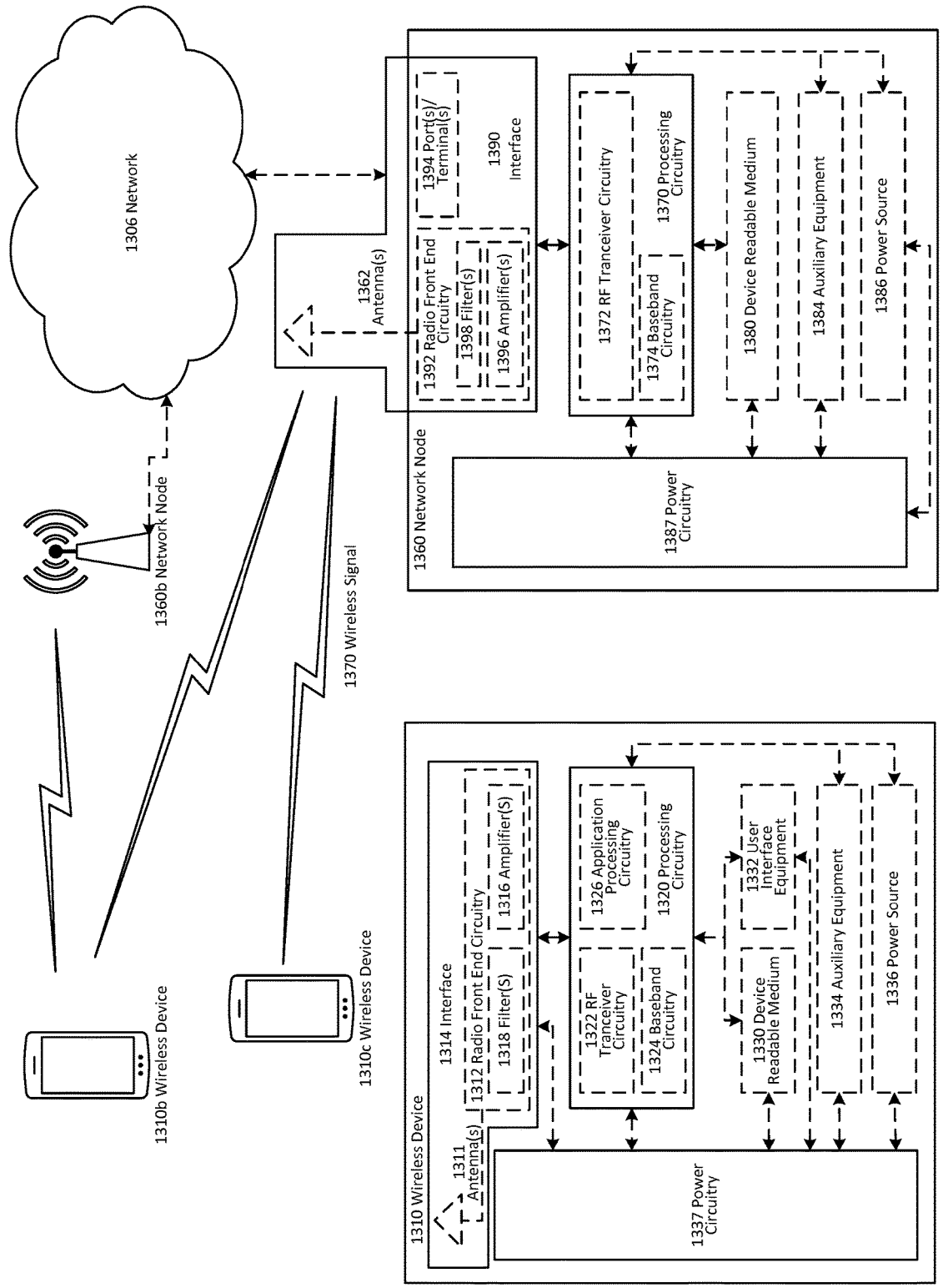
FIG. 13 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360*b*, and WDs 1310, 1310*b*, and 1310*c*. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IOT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network. Any of the above described network nodes may implement the network node implemented methods described in FIGS. 5A through 4B.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, NB-IOT, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
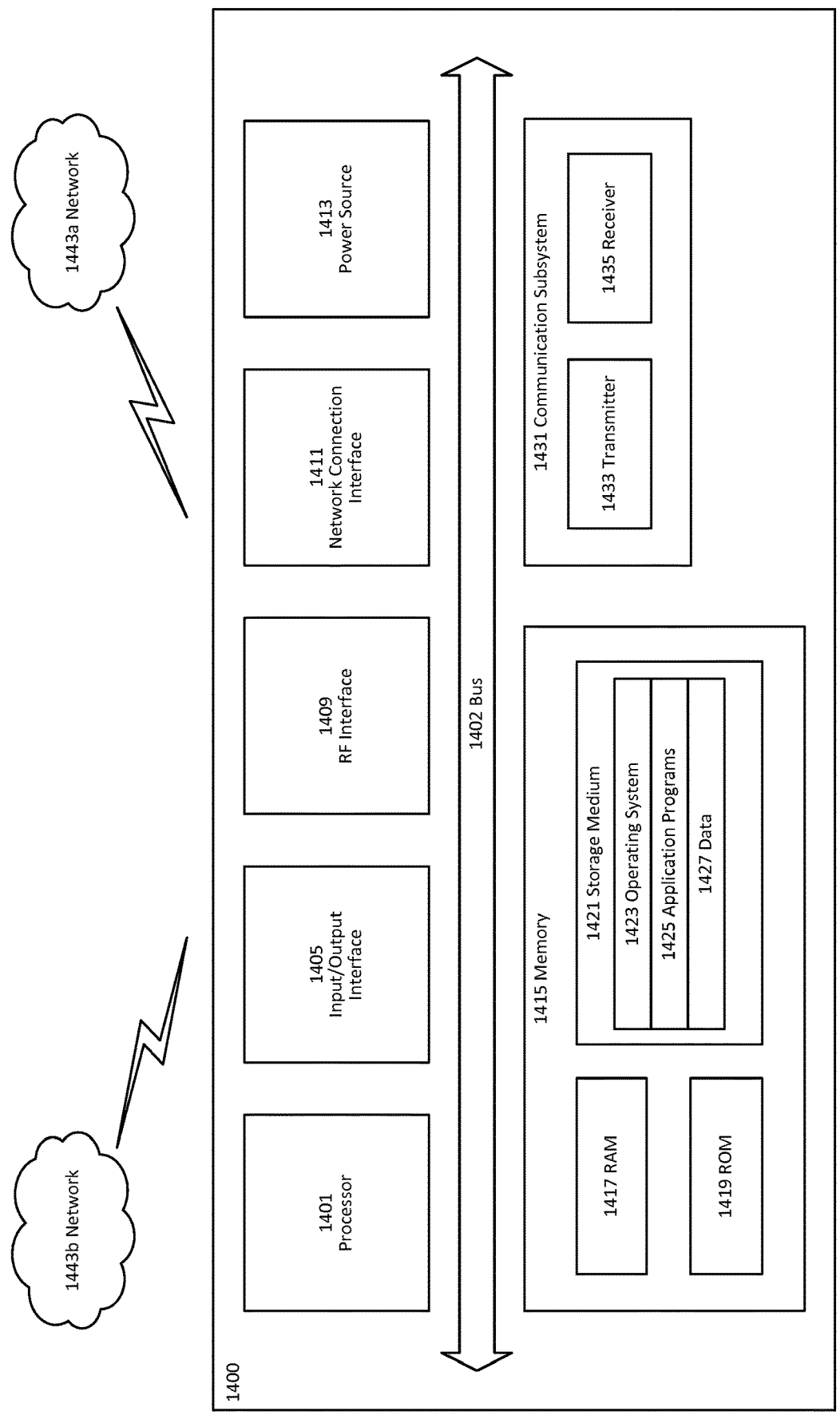
FIG. 14 is a block diagram of a user equipment according to some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IOT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443a. Network 1443a may encompass wired and/or wireless networks such as a local-area network (LAN), a wide-area network (WAN), a computer network, a wireless network, a telecommunications network, another like network or any combination thereof. For example, network 1443a may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443b using communication subsystem 1431. Network 1443a and network 1443b may be the same network or networks or different network or networks. Communication subsystem 1431 may be configured to include one or more transceivers used to communicate with network 1443b. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443b may encompass wired and/or wireless networks such as a local-area network (LAN), a wide-area network (WAN), a computer network, a wireless network, a telecommunications network, another like network or any combination thereof. For example, network 1443b may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
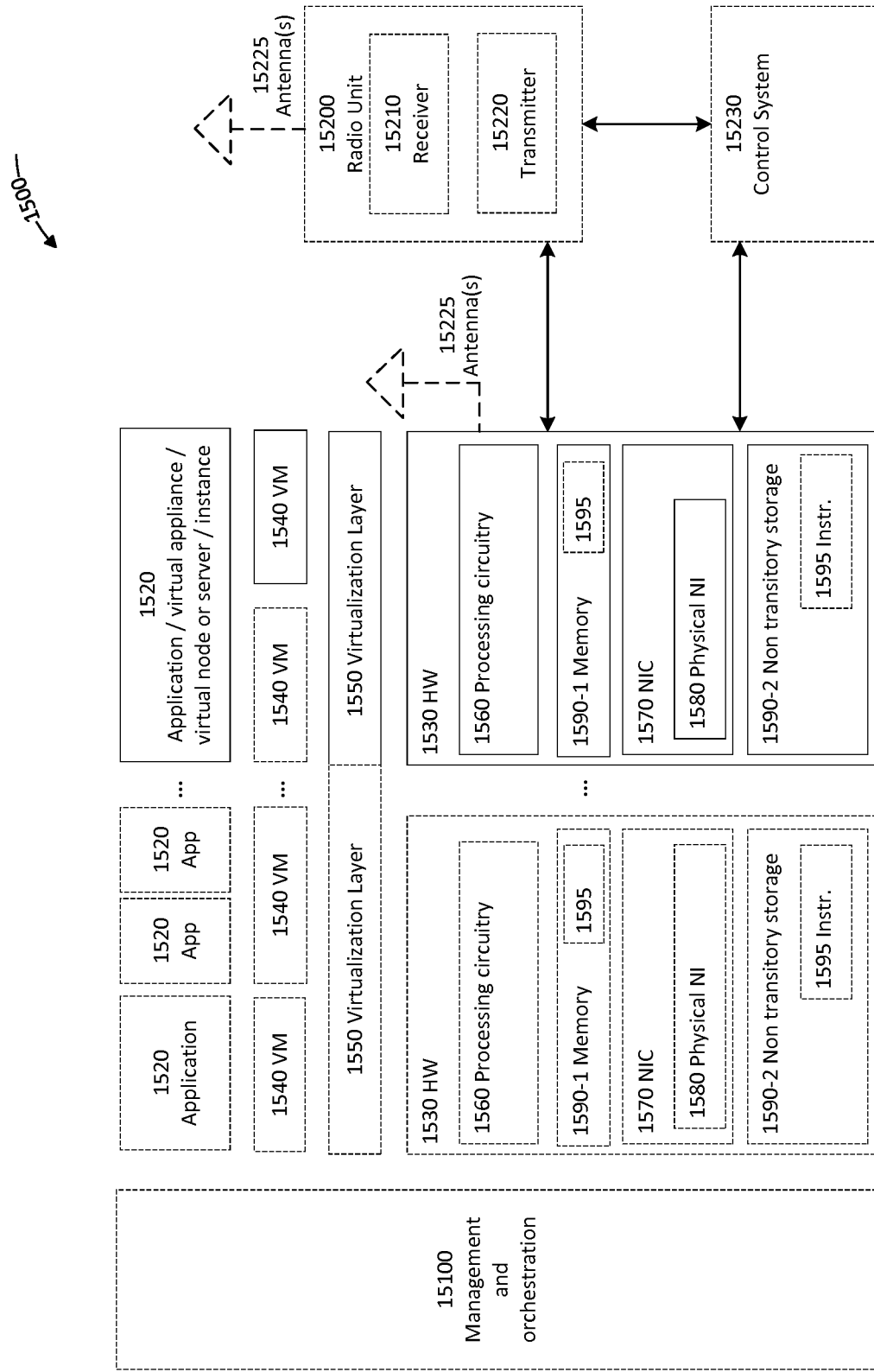
FIG. 15 is a block diagram of a virtualization environment according to some embodiments.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be effected with the use of control system 15230 which may alternatively be used for communication between the hardware nodes 1530 and radio units 15200.

Figure 16:
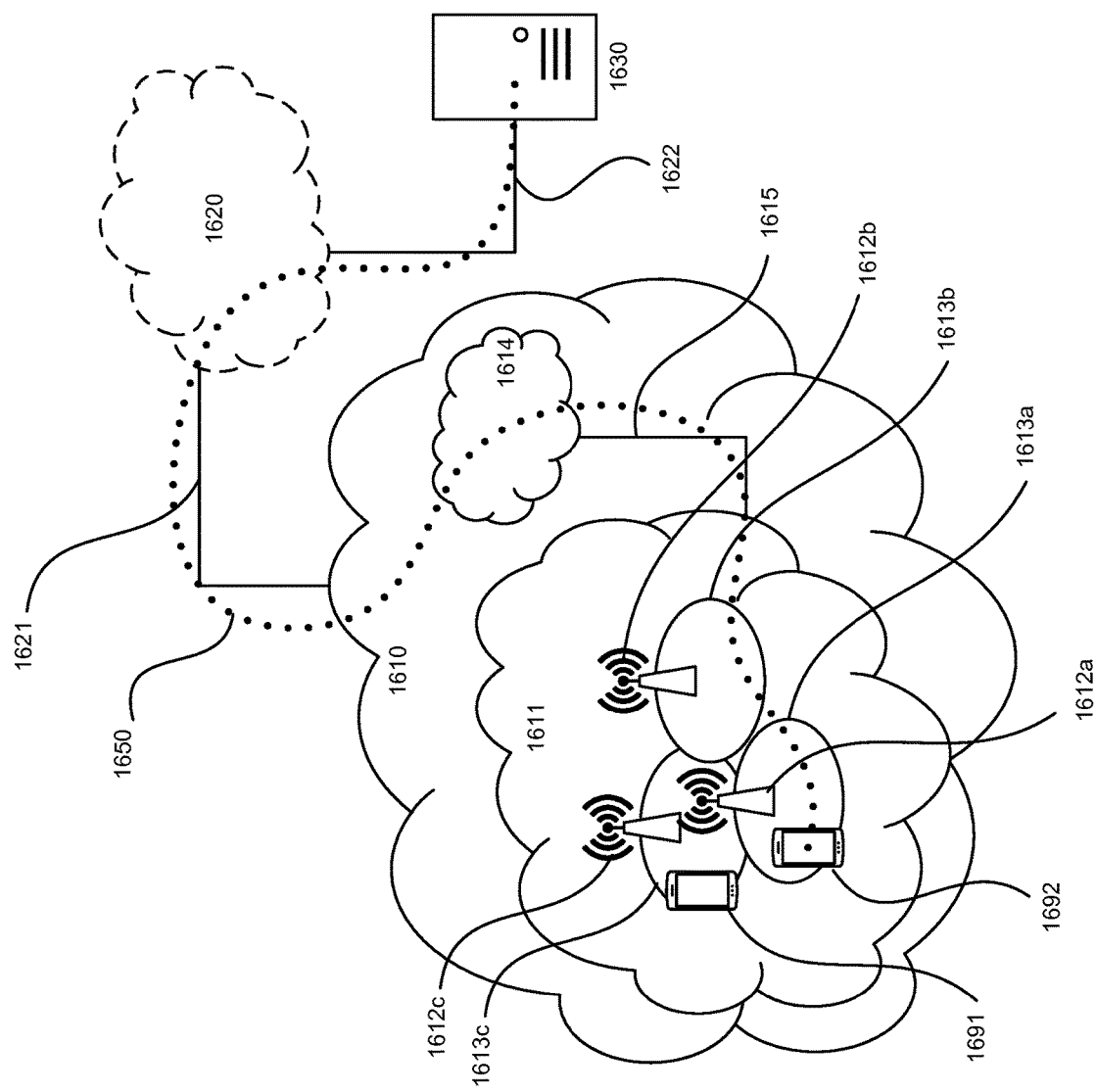
FIG. 16 is a block diagram of a communication network with a host computer according to some embodiments.

FIG. 16 illustrates a telecommunication network connected via an intermediate network to a host computer in accordance with some embodiments. In particular, with reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Figure 17:
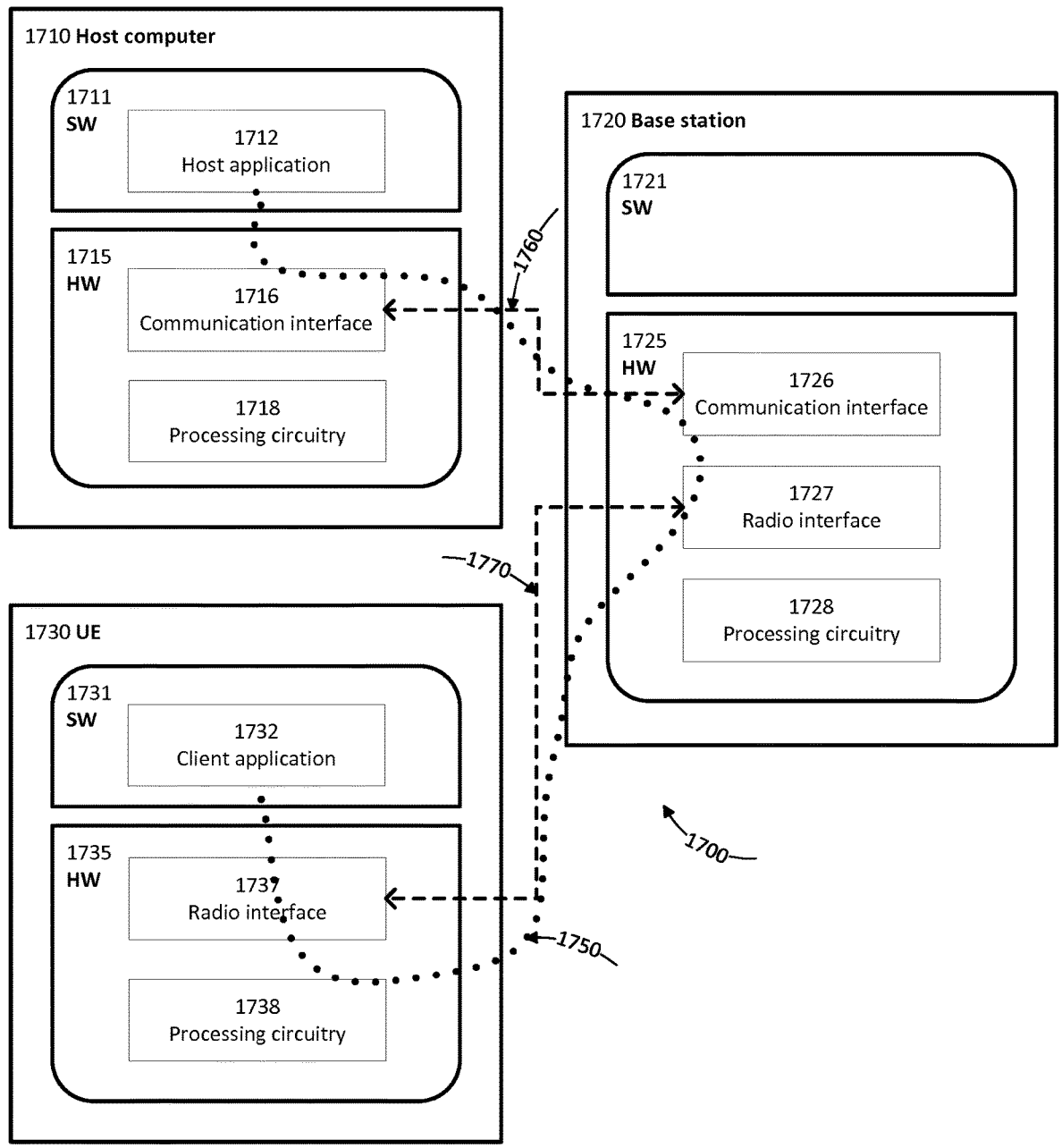
FIG. 17 is a block diagram of a host computer according to some embodiments.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612*a*, 1612*b*, 1612*c* and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the teachings of these embodiments may improve the reference signal overhead, data rate, and wireless device power consumption and thereby provide benefits such as improved system capacity and performance, reduced user waiting time, relaxed restriction on file size, and extended wireless device battery lifetime.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
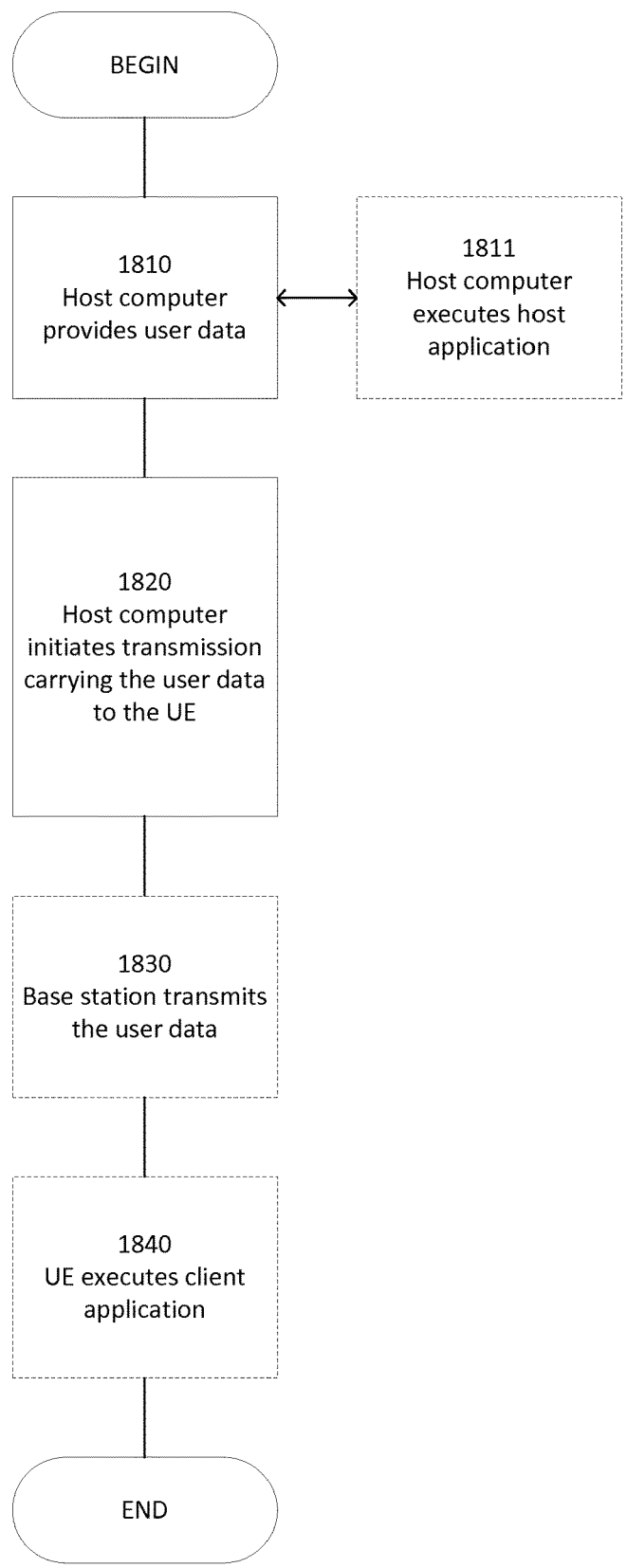
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

Figure 19:
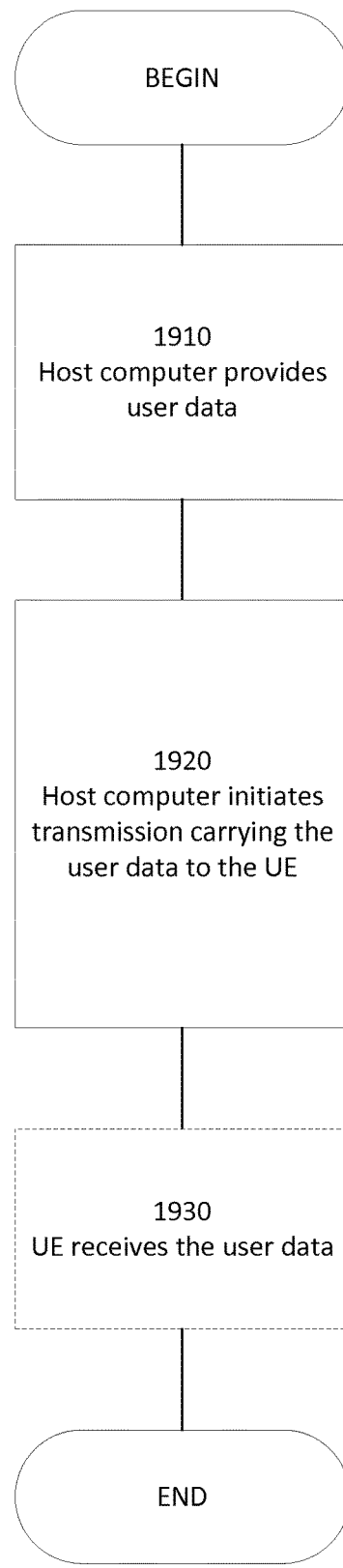
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
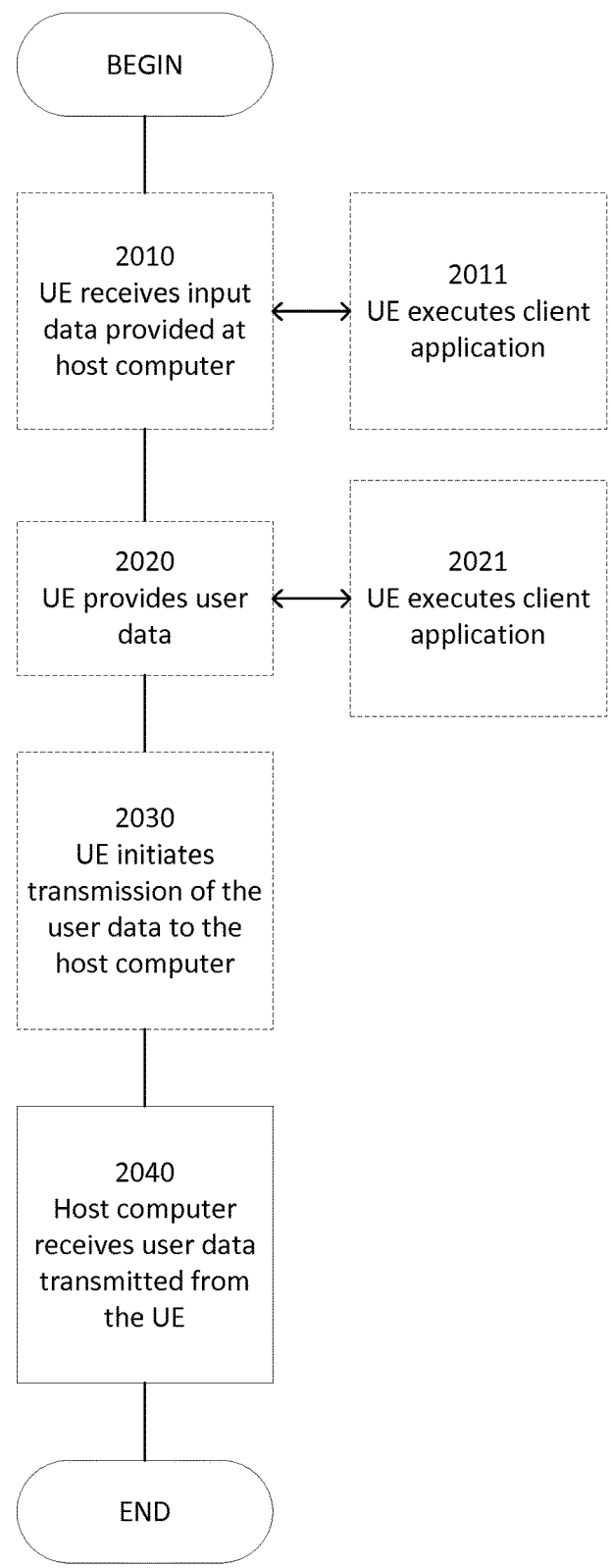
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

Figure 21:
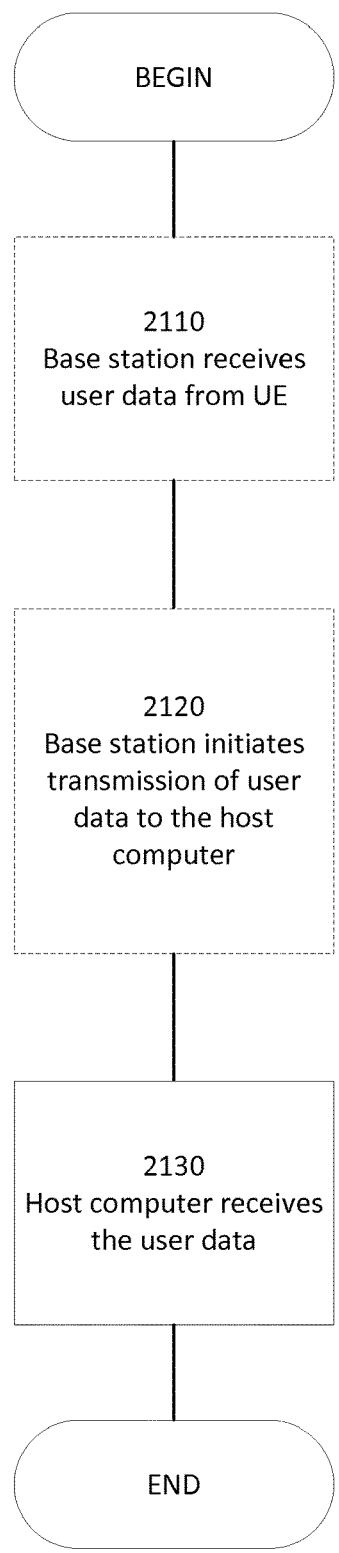
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A wireless device configured for use in a wireless communication system, the wireless device comprising:
   communication circuitry; and
   processing circuitry configured to receive, from a network node, signaling indicating that a reference signal is configured to be transmitted before and/or during:
      every L occurrence of a physical downlink control channel search space, wherein L≥2; or
      every K discontinuous reception, DRX, cycle, wherein K≥2.

2. The wireless device of claim 1, wherein the processing circuitry is further configured to receive the reference signal, in accordance with the received signaling, before and/or during:
   every L occurrence of a physical downlink control channel search space; or
   every K DRX cycle.

3. The wireless device of claim 1, wherein the processing circuitry is further configured to use reference symbols of the reference signal to estimate or verify a downlink signal strength or quality.

4. The wireless device of claim 3, wherein the processing circuitry is further configured to, based on the estimated or verified downlink signal strength or quality, determine whether to terminate an attempt to detect a physical downlink control channel or a wake-up signal early, before receipt of a maximum number of repetitions configured for the physical downlink control channel or the wake-up signal.

5. The wireless device of claim 3, wherein the processing circuitry is further configured to:
   receive a different reference signal on an anchor carrier; and
   estimate the downlink signal strength or quality based on measurement of the different reference signal received on the anchor carrier and on a power difference between a non-anchor carrier and the anchor carrier; and
   use reference symbols of the reference signal as received on the non-anchor carrier to verify the downlink signal strength or quality.

6. The wireless device of claim 1, wherein the processing circuitry is further configured to:
   receive, from the network node, signaling indicating a configuration of the reference signal, wherein the configuration of the reference signal includes configuration of a number of downlink subframes that are to each contain reference symbols of the reference signal;
   determine whether the configuration of the reference signal supports early termination by the wireless device, wherein early termination comprises termination of an attempt to detect a physical downlink control channel or a wake-up signal before receipt of a maximum number of repetitions configured for the physical downlink control channel or the wake-up signal; and
   attempt or not attempt early termination depending respectively on whether or not the configuration of the reference signal supports early termination by the wireless device.

7. The wireless device of claim 6, wherein the processing circuitry is further configured to respectively determine whether or not the number of downlink subframes that are to each contain reference symbols of the reference signal according to the configuration is at least as great as a required number of downlink subframes that the wireless device requires in order to estimate from that reference signal downlink signal strength or quality within a certain range, wherein the certain range includes downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal.

8. The wireless device of claim 1, wherein the processing circuitry is further configured to:
   receive from the network node signaling indicating a number of downlink subframes that are each configured to contain reference symbols of the reference signal; and
   determine whether to measure the reference symbols of the reference signal in the downlink subframes in order to estimate a downlink signal strength or quality, depending respectively on whether or not the indicated number of downlink subframes is at least as great as a required number of downlink subframes that the wireless device requires to each contain reference symbols of the reference signal in order to estimate downlink signal strength or quality from that reference signal.

9. The wireless device of claim 8, wherein the required number of downlink subframes is a number of downlink subframes that the wireless device requires to each contain reference symbols of the reference signal in order to estimate from the reference signal downlink signal strength or quality within a certain range, wherein the certain range includes downlink signal strengths or qualities that are greater than a minimum downlink signal strength or quality above which the wireless device is configured to terminate an attempt to detect a physical downlink control channel or a wake-up signal early, before receipt of a maximum number of repetitions configured for the physical downlink control channel or the wake-up signal.

10. The wireless device of claim 1, wherein the processing circuitry is further configured to transmit to the network node signaling indicating that the wireless device is capable of early termination, wherein early termination comprises termination of an attempt to detect a physical downlink control channel or a wake-up signal before receipt of a maximum number of repetitions configured for the physical downlink control channel or the wake-up signal.

11. The wireless device of claim 1, wherein the reference signal is a narrowband reference signal on a non-anchor carrier.

12. The wireless device of claim 1, wherein the wireless communication system is a narrowband internet-of-things (NB-IOT) system.

13. A network node configured for use in a wireless communication system, the network node comprising:
   communication circuitry; and
   processing circuitry configured to transmit, to a wireless device, signaling indicating that a reference signal is configured to be transmitted before and/or during:
      every L occurrence of a physical downlink control channel search space, wherein L≥2; or
      every K discontinuous reception, DRX, cycle, wherein K≥2.

14. The network node of claim 13, wherein the processing circuitry is further configured to transmit the reference signal, in accordance with the signaling, before and/or during:
   every L occurrence of a physical downlink control channel search space; or
   every K DRX cycle.

15. The network node of claim 13, wherein the processing circuitry is further configured to receive signaling indicating whether a wireless device is capable of early termination, wherein early termination comprises termination of an attempt to detect a physical downlink control channel or a wake-up signal before receipt of a maximum number of repetitions configured for the physical downlink control channel or the wake-up signal.

16. The network node of claim 15, wherein the processing circuitry is further configured to, based on the received signaling, configure whether and/or when reference symbols of the reference signal is to be transmitted.

17. The network node of claim 13, wherein the processing circuitry is further configured to:
   receive, for each of one or more wireless devices served by the network node, signaling indicating whether the wireless device is capable of early termination;
   determine, based on the received signaling, whether a minimum number of wireless devices served by the network node are capable of early termination; and
   configure the reference signal to be transmitted or to not be transmitted, depending respectively on whether the minimum number of wireless devices served by the network node are capable of early termination.

18. A method performed by a wireless device configured for use in a wireless communication system, the method comprising:
   receiving, from a network node, signaling indicating that a reference signal is configured to be transmitted before and/or during:
      every L occurrence of a physical downlink control channel search space, wherein L≥2; or
      every K discontinuous reception, DRX, cycle, wherein K≥2.

19. The method of claim 18, further comprising receiving the reference signal, in accordance with the received signaling, before and/or during:
   every L occurrence of a physical downlink control channel search space; or
   every K DRX cycle.

20. The method of claim 18, further comprising using reference symbols of the reference signal to estimate or verify a downlink signal strength or quality.

21. The method of claim 18, further comprising, based on the estimated or verified downlink signal strength or quality, determining whether to terminate an attempt to detect a physical downlink control channel or a wake-up signal early, before receipt of a maximum number of repetitions configured for the physical downlink control channel or the wake-up signal.

22. The method of claim 20, further comprising:
   receiving a different reference signal on an anchor carrier; and
   estimating the downlink signal strength or quality based on measurement of the different reference signal received on the anchor carrier and on a power difference between a non-anchor carrier and the anchor carrier; and
   wherein said using comprises using reference symbols of the reference signal as received on the non-anchor carrier to verify the downlink signal strength or quality.

23. The method of claim 18, further comprising:
   receiving from the network node signaling indicating a number of downlink subframes that are each configured to contain reference symbols of the reference signal; and
   determining whether to measure the reference symbols of the reference signal in the downlink subframes in order to estimate a downlink signal strength or quality, depending respectively on whether or not the indicated number of downlink subframes is at least as great as a required number of downlink subframes that the wireless device requires to each contain reference symbols of the reference signal in order to estimate downlink signal strength or quality from that reference signal.

24. A method performed by a network node in a wireless communication system, the method comprising:
   transmitting, to a wireless device, signaling indicating that a reference signal is configured to be transmitted before and/or during:
      every L occurrence of a physical downlink control channel search space, wherein L≥2; or
      every K discontinuous reception, DRX, cycle, wherein K≥2.

* * * * *